US012810366B2

(12) United States Patent
Blanchard et al.

(10) Patent No.: US 12,810,366 B2
(45) Date of Patent: Nov. 24, 2026

(54) DISTRIBUTED ENERGY RESOURCE OPTIMIZATION WITH UNIFIED INCENTIVES

(71) Applicant: WattShift, Inc., Chicago, IL (US)

(72) Inventors: William Blanchard, Chicago, IL (US); Manas Verma, Duluth, MN (US); David Cole, Madison, WI (US)

(73) Assignee: WattShift, Inc., Chicago, IL (US)

( * ) Notice: Subject to any disclaimer, the term of this patent is extended or adjusted under 35 U.S.C. 154(b) by 80 days.

(21) Appl. No.: 18/656,352

(22) Filed: May 6, 2024

(65) Prior Publication Data

US 2024/0370950 A1 Nov. 7, 2024

Related U.S. Application Data

(60) Provisional application No. 63/464,107, filed on May 4, 2023.

(51) Int. Cl.
*G06Q 50/06* (2024.01)
*F24F 11/46* (2018.01)
(Continued)

(52) U.S. Cl.
CPC .............. *G06Q 50/06* (2013.01); *F24F 11/46* (2018.01); *F24F 11/47* (2018.01); *F24F 11/64* (2018.01);
(Continued)

(58) Field of Classification Search
CPC ... G06Q 50/06; G06Q 10/06312; F24F 11/46; F24F 11/47; F24F 11/64; F24H 15/156; F24H 15/164
See application file for complete search history.

(56) References Cited

U.S. PATENT DOCUMENTS 8,285,419 B2 * 10/2012 Drew ................. G05D 23/1923 700/295
8,538,586 B2 * 9/2013 Amundson .............. F24F 11/30 705/40
(Continued)

FOREIGN PATENT DOCUMENTS

EP 2919349 A1 * 9/2015 ............. G06Q 50/06
WO WO-2019023715 A1 * 1/2019 ........... G05B 13/027

*Primary Examiner* — Dylan C White
(74) *Attorney, Agent, or Firm* — Schwegman Lundberg & Woessner, P.A.

(57) ABSTRACT

Distributed energy resources (DERs) are remotely controlled devices that are connected to the electric grid and can affect the grid. The effect could be the result of consuming electricity, generating electricity, or storing electricity. Common examples of DERs include thermostats, electric vehicles (EVs), home batteries, and electric water heaters. DERs may be controlled to take advantage of multiple incentive programs offered by one or more incentive providers. The DER optimization may involve interacting with a carbon marketplace, a renewable energy credit marketplace, or both. A customer may provide preference data that indicates preferred and acceptable values for conditions of one or more DERs. Multiple incentives are combined into a single price signal. Based on the price signal and customer preference data, a schedule for energy consumption is generated. One or more DERs are controlled according to the generated schedule.

20 Claims, 13 Drawing Sheets

(51) Int. Cl.

| | |
|---|---|
| ***F24F 11/47*** | (2018.01) |
| ***F24F 11/64*** | (2018.01) |
| ***F24H 15/156*** | (2022.01) |
| ***F24H 15/164*** | (2022.01) |
| ***G06Q 10/0631*** | (2023.01) |

(52) U.S. Cl.

CPC ......... *F24H 15/156* (2022.01); *F24H 15/164* (2022.01); *G06Q 10/06312* (2013.01)

(56) References Cited

U.S. PATENT DOCUMENTS

| | | | | |
|---|---|---|---|---|
| 9,310,792 | B2 * | 4/2016 | Lu | G06Q 10/04 |
| 10,041,695 | B2 * | 8/2018 | Chandan | G05D 23/1923 |
| 11,043,815 | B2 * | 6/2021 | Meeker | G06Q 50/06 |
| 11,411,402 | B1 * | 8/2022 | Singh | G06Q 50/06 |
| 2004/0034484 | A1 * | 2/2004 | Solomita, Jr. | H02J 3/14 702/62 |
| 2004/0076978 | A1 * | 4/2004 | Verfaillie | C12Q 1/6886 435/325 |
| 2008/0272934 | A1 * | 11/2008 | Wang | H02J 13/00026 340/870.11 |
| 2009/0198384 | A1 * | 8/2009 | Ahn | H02J 13/00002 700/295 |
| 2011/0184562 | A1 * | 7/2011 | Amundson | G06Q 30/00 715/702 |
| 2013/0261823 | A1 * | 10/2013 | Krok | G05F 5/00 700/291 |
| 2014/0188295 | A1 * | 7/2014 | Saito | G06Q 50/06 700/291 |
| 2022/0253078 | A1 * | 8/2022 | Reeder | G05D 23/1923 |
| 2023/0315135 | A1 | 10/2023 | Reeder et al. | |
| 2025/0258470 | A1 * | 8/2025 | Alexander | G05B 19/042 |

* cited by examiner

600

610

| CUSTOMER TABLE | | | |
|---|---|---|---|
| USER ID | NAME | ADDRESS | ZIP |
| 1234 | ADAM SMITH | 123 MAIN ST. | 90210 |
| 2345 | JOHN JAY | 234 SECOND ST. | 95209 |
| 3456 | JAMES WILSON | 345 POPLAR ST. | 97123 |

620, 630A, 630B, 630C

640

| ZIP TABLE | |
|---|---|
| ZIP | UTILITY ID |
| 90210 | 0001 |
| 95209 | 0002 |
| 97123 | 0002 |

650, 660A, 660B, 660C

670

| RATE TABLE | | | |
|---|---|---|---|
| UTILITY | START TIME | END TIME | RATE |
| 0001 | 2024-01-01 00:00:00 | 2024-01-01 05:00:00 | .12 |
| 0001 | 2024-01-01 05:00:00 | 2024-01-01 06:00:00 | .15 |
| 0002 | 2024-01-01 00:00:00 | 2024-01-01 03:00:00 | .22 |

680, 690A, 690B, 690C

*FIG. 6*

600

710

| DEMAND RESPONSE TABLE | | | | | |
|---|---|---|---|---|---|
| 720 | UTILITY | START TIME | END TIME | REDUCTION CREDIT | DERMS PAYMENT |
| 730A | 0001 | 2024-01-01 16:00:00 | 2024-01-01 17:30:00 | .04 | .03 |
| 730B | 0001 | 2024-01-02 16:00:00 | 2024-01-02 17:30:00 | .05 | .04 |
| 730C | 0002 | 2024-01-01 14:00:00 | 2024-01-01 18:00:00 | .06 | .05 |

740

| UTILITY FUEL TABLE | | | | | |
|---|---|---|---|---|---|
| 750 | UTILITY | START TIME | END TIME | FUEL | PERCENT |
| 760A | 0001 | 2024-01-01 00:00:00 | 2024-01-01 06:00:00 | OIL | 50% |
| 760B | 0001 | 2024-01-01 00:00:00 | 2024-01-01 06:00:00 | NATURAL GAS | 25% |
| 760C | 0001 | 2024-01-01 00:00:00 | 2024-01-01 06:00:00 | HYDRO | 25% |
| 760D | 0001 | 2024-01-01 06:00:00 | 2024-01-01 18:00:00 | OIL | 10% |
| 760E | 0001 | 2024-01-01 06:00:00 | 2024-01-01 18:00:00 | NATURAL GAS | 15% |
| 760F | 0001 | 2024-01-01 06:00:00 | 2024-01-01 18:00:00 | HYDRO | 25% |
| 760G | 0001 | 2024-01-01 06:00:00 | 2024-01-01 18:00:00 | SOLAR | 50% |

*FIG. 7*

600

810

| FUEL CARBON TABLE | |
|---|---|
| FUEL | CARBON |
| OIL | 2.38 |
| NATURAL GAS | 0.97 |
| HYDRO | 0 |

820, 830A, 830B, 830C

840

| NON-NET METERED SOLAR TABLE | | | |
|---|---|---|---|
| UTILITY | START TIME | END TIME | SOLAR VALUE |
| 0001 | 2024-01-01 00:00:00 | 2024-01-01 06:00:00 | 0.08 |
| 0001 | 2024-01-01 06:00:00 | 2024-01-01 18:00:00 | 0.04 |
| 0001 | 2024-01-01 18:00:00 | 2024-01-02 06:00:00 | 0.08 |

850, 860A, 860B, 860C

870

| WHOLESALE TABLE | | | |
|---|---|---|---|
| ISO | START TIME | END TIME | RATE |
| CAISO | 2024-01-01 05:00:00 | 2024-01-01 06:00:00 | .06 |
| CAISO | 2024-01-01 06:00:00 | 2024-01-01 07:00:00 | .08 |
| ERCOT | 2024-01-01 00:00:00 | 2024-01-01 06:00:00 | .05 |

880, 890A, 890B, 890C

*FIG. 8*

600

910

| DEVICE TABLE | | |
|---|---|---|
| USER ID | DEVICE ID | DEVICE TYPE |
| 1234 | A1 | THERMOSTAT |
| 1234 | A2 | HOME BATTERY |
| 1234 | A3 | WATER HEATER |

(920: header row; 930A, 930B, 930C: rows)

940

| THERMOSTAT TABLE | | | | | |
|---|---|---|---|---|---|
| DEVICE ID | START TIME | END TIME | TARGET | MIN | MAX |
| A1 | 2024-01-01 00:00:00 | 2024-01-01 06:00:00 | 66 | 64 | 74 |
| A1 | 2024-01-01 06:00:00 | 2024-01-01 18:00:00 | 72 | 68 | 74 |
| A1 | 2024-01-01 18:00:00 | 2024-01-02 06:00:00 | 66 | 64 | 74 |

(950: header row; 960A, 960B, 960C: rows)

970

| CUSTOMER SOLAR TABLE | | |
|---|---|---|
| USER ID | DAYTIME SOLAR | DAYTIME NON-DER CONSUMPTION |
| 1234 | 250 W | 1300 W |
| 2345 | 600 W | 300 W |
| 3456 | 0 | 1600 W |

(980: header row; 990A, 990B, 990C: rows)

*FIG. 9*

DISTRIBUTED ENERGY RESOURCE OPTIMIZATION WITH UNIFIED INCENTIVES

PRIORITY CLAIM

The application claims priority to U.S. Provisional Patent Application No. 63/464,107, entitled "Generalized Distributed Energy Resource Optimization with Unified Price Schedule," filed on May 4, 2023, which application is incorporated herein by reference in its entirety.

TECHNICAL FIELD

The subject matter disclosed herein generally relates to energy resource optimization. Specifically, in some example embodiments, the present disclosure addresses systems and methods for distributed energy resource optimization with unified incentives.

BACKGROUND

State utility regulators (PUCs), the Federal Energy Regulatory Commission (FERC), wholesale electricity markets, electricity utilities, and others are increasingly creating incentives for shifting electricity from peak to off-peak times. A utility may implement a demand response program to reduce peak load. For example, a customer may receive a discount to their utility bill and, in exchange, agree to reduce power consumption for a period of time when directed to do so by the utility.

BRIEF DESCRIPTION OF THE DRAWINGS

Some embodiments are illustrated by way of example and not limitation in the figures of the accompanying drawings.

FIGS. 6-9 are block diagrams illustrating a database schema suitable for use by the optimization server in optimizing energy resource consumption, according to some example embodiments.

DETAILED DESCRIPTION

Figure 1:
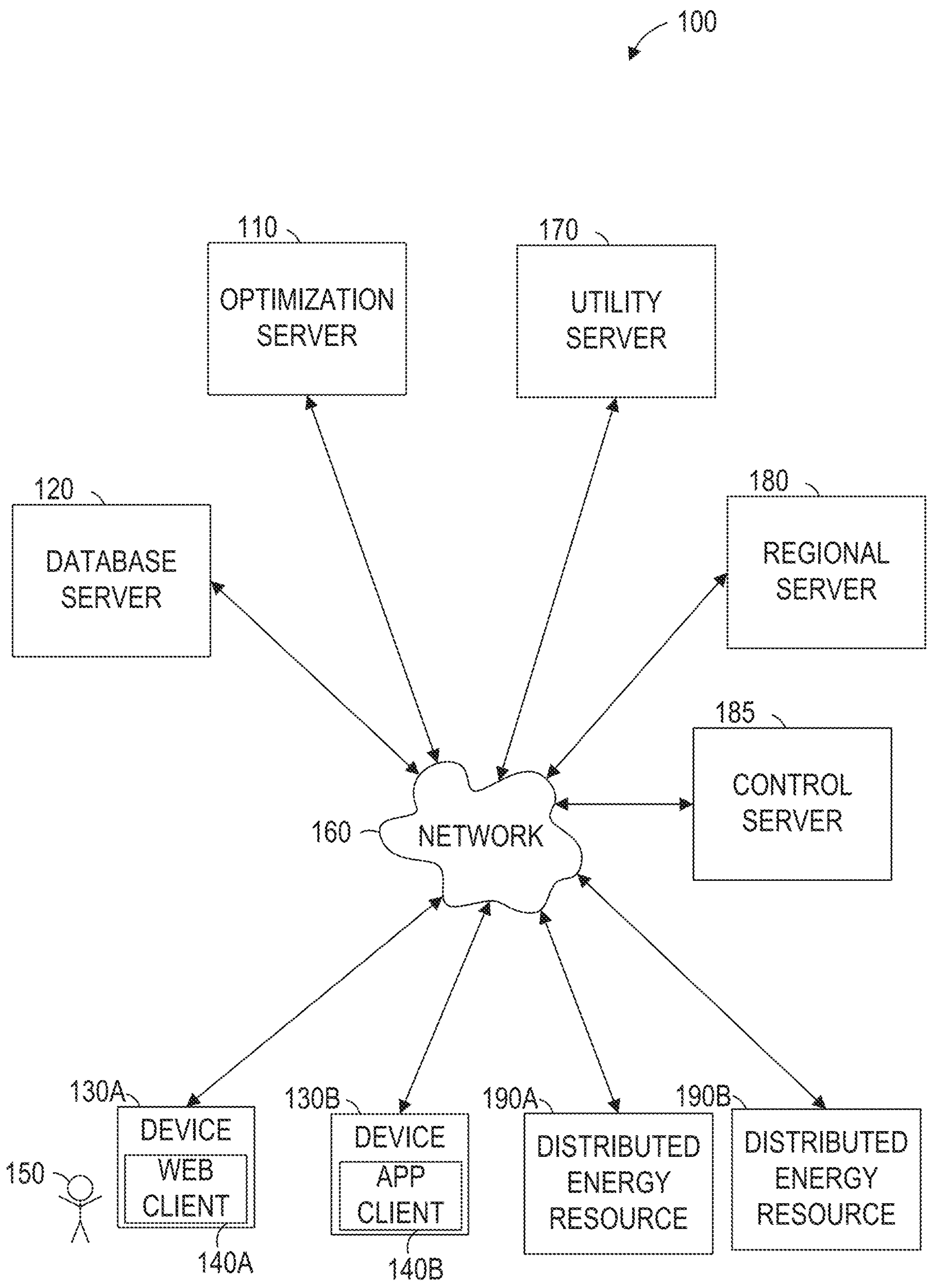
FIG. 1 is a network diagram illustrating a network environment suitable for distributed energy resource optimization with unified incentives, according to some example embodiments.

Example methods and systems are directed to distributed energy resource optimization with unified incentives. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A distributed energy resource (DER) brand is an entity that provides software for DERs. DERs are internet-connected (or otherwise remotely controlled or intelligently controlled) devices that are connected to the electric grid and can affect the grid nearby. The affect could be the result of consuming electricity, generating electricity, storing electricity (or other energy type) either to avoid future consumption or to push it back to the home or grid. Common examples of DERs include thermostats, electric vehicles (EVs), home batteries, and electric water heaters.

DERs may be controlled to take advantage of multiple incentive programs offered by one or more incentive providers. For example, an electric utility may incentivize use of power at off-peak times by using variable pricing. A variable pricing scheme could include different rates to different times (e.g., at daily, hourly, or minute-by-minute granularity), a surcharge when total demand exceeds a predetermined threshold, a fee based on maximum power consumption by the customer, or any suitable combination thereof.

As another example, a wholesale electricity market may pay for power consumption reduction at peak times. For example, the marginal cost of increased power consumption to satisfy demand may be greater than the price demanded by a customer to forgo power consumption. Wholesale electricity markets include day-ahead markets, real-time markets, ancillary services markets, and the like.

Customers may also be concerned with carbon generation. Accordingly, the DER optimization may involve interacting with a carbon marketplace, a renewable energy credit marketplace, or both. For example, a customer with a 24/7 renewable energy goal may purchase carbon offset credits to compensate for carbon generated by consuming electricity generated with fossil fuels.

A customer may provide preference data that indicates preferred and acceptable values for conditions of one or more DERs. For example, a preferred temperature value for a thermostat along with an acceptable temperature range for the thermostat may be provided by the customer.

Multiple incentives are combined into a single price signal. Based on the price signal and customer preference data, a schedule for energy consumption is generated. One or more DERs are controlled according to the generated schedule.

Using the generated schedule to control the one or more DERs may reduce peak power consumption, reduce cost, increase carbon savings, or any suitable combination thereof. Using the generated schedule to the control the one or more DERs may achieve these benefits without reducing the benefit provided to the customer by the one or more DERs. For example, by pre-cooling a home to a minimum acceptable temperature while rates are low and then allowing the home to rise to a maximum acceptable temperature while rates are high (or incentives to avoid consumption are high) keeps the home within the acceptable temperature range while reducing cost.

The systems and methods disclosed herein allow rate payers to easily take advantage of incentive programs. The incentive programs are designed for the purpose of extending the lifespan of power grids, reducing carbon generation, avoiding brownouts, and the like. Accordingly, increasing participation in the incentive programs helps achieve all of these goals.

FIG. 1 is a network diagram illustrating a network environment 100 suitable for distributed energy resource optimization with unified incentives, according to some example embodiments. The network environment 100 includes an optimization server 110; a database server 120; a utility server 170; a regional server 180; a control server 185; computing devices 130A and 130B; and DERs 190A and 190B, all communicatively coupled to each other via a network 160. The computing devices 130A and 130B may be collectively referred to as "devices 130," or generically referred to as a "device 130." The DERs 190A and 190B may be collectively referred to as DERs 190 or generically referred to as a DER 190.

The optimization server 110 is a network-based system. The computing devices 130 may interact with the optimization server 110 using a web client 140A or an app client 140B. The optimization server 110, the database server 120, the utility server 170, the regional server 180, the control server 185, and the computing devices 130 may each be implemented in a computer system, in whole or in part, as described below with respect to FIGS. 12-13. The DERs 190 may comprise a computer system as described below with respect to FIGS. 12-13, or a portion thereof.

The optimization server 110 provides a user interface for receiving customer preferences (e.g., on a display of the devices 130) via the network 160. The user interface may allow the user to select a preferred temperature, an acceptable temperature range, a carbon value, or any suitable combination thereof.

The optimization server 110 accesses incentive data, pricing data, or both from the database server 120, the utility server 170, the regional server 180, other servers, or any suitable combination thereof. Based on the incentive and pricing data, the optimization server 110 determines a unified price signal for the customer. Based on the unified price signal and the customer preferences, the optimization server 110 determines an operating schedule for the DER 190A, the DER 190B, or both. The optimization server 110 communicates the operating system for a DER 190 either to the DER 190 itself or to the control server 185. For example, the DER 190A may be configured by the optimization server with twenty-four hours of advanced scheduling.

As another example, the optimization server 110 may communicate a schedule for the DER 190B to the control server 185. The control server 185 may implement the schedule by sending commands via the network 160 to the DER 190B as required by the schedule. For example, the control server 185 may send instructions to the DER 190B once each hour.

Also shown in FIG. 1 is a user 150. The user 150 may be a human user (e.g., a human being), a machine user (e.g., a computer configured by a software program to interact with the devices 130 and the optimization server 110), or any suitable combination thereof (e.g., a human assisted by a machine or a machine supervised by a human). The user 150 is not part of the network environment 100, but is associated with the devices 130 and 190 and may be a user of the devices 130 (e.g., an owner of the devices 130A, 130B, 190A, and 190B). For example, the device 130A may be a desktop computer, a vehicle computer, a tablet computer, a navigational device, a portable media device, or a smart phone belonging to the user 150. The DERs 190A-190B may be thermostats, hot water heaters, heaters, water pumps, or the like belonging to the user 150.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 12-13. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 160 may be any network that enables communication between or among machines, databases, and devices (e.g., the optimization server 110 and the devices 130). Accordingly, the network 160 may be a wired network, a wireless network (e.g., a mobile or cellular network), or any suitable combination thereof. The network 160 may include one or more portions that constitute a private network, a public network (e.g., the Internet), or any suitable combination thereof.

Figure 2:
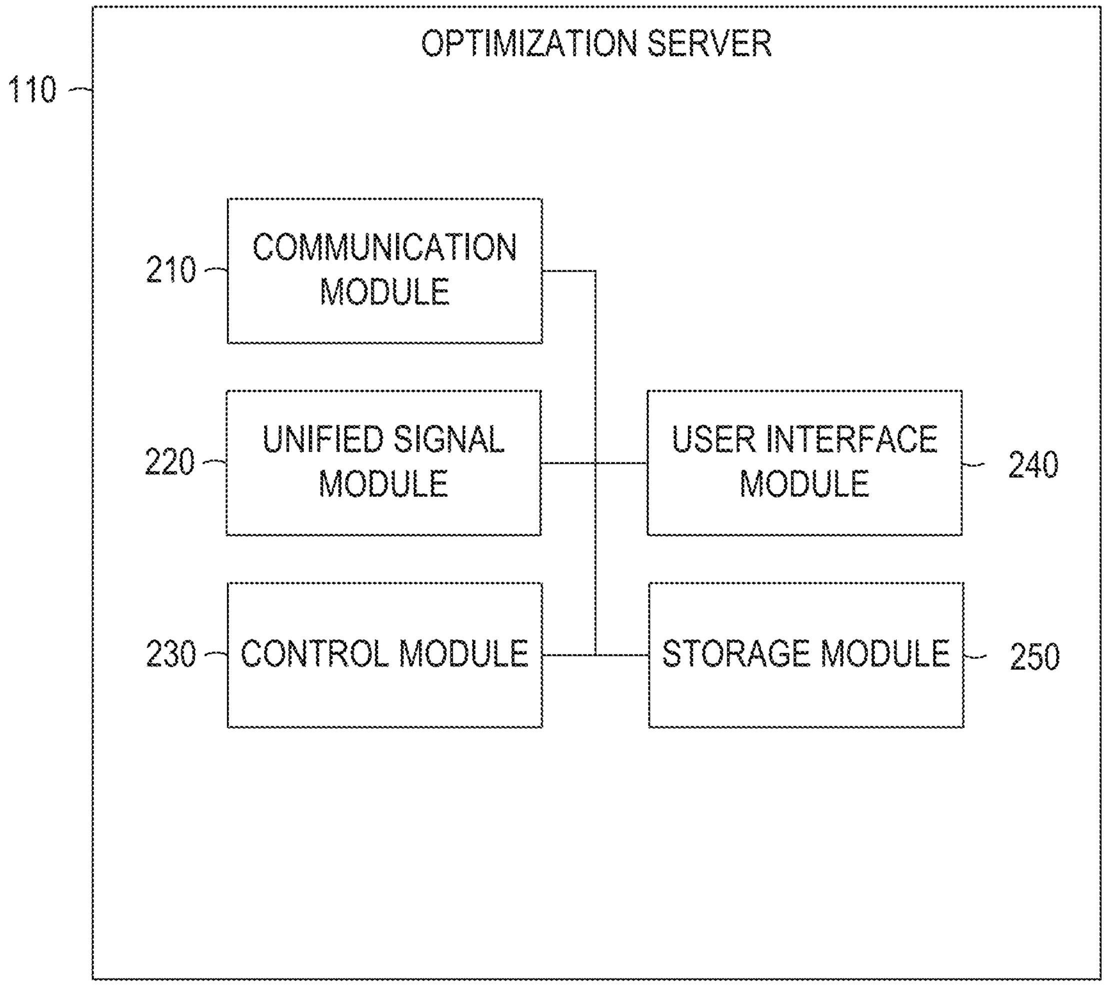
FIG. 2 is an architectural diagram illustrating components of an optimization server for controlling distributed energy resource optimization with unified incentives, according to some example embodiments.

FIG. 2 is an architectural diagram illustrating components of the optimization server 110 for controlling distributed energy resource optimization with unified incentives, according to some example embodiments. The optimization server 110 includes a communication module 210, a unified signal module 220, a control module 230, a user interface module 240, and a storage module 250, all configured to communicate with each other (e.g., via a bus, shared memory, a switch, or APIs). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 is configured to send and receive data. For example, the communication module 210 may receive, over the network 160, a request for a user interface for setting customer preferences from a device 130. The communication module 210 may provide the request to the user interface module 240, transmit a user interface provided by the user interface module 240 to the device 130, and receive user selections of options in the user interface for processing by the control module 230, storage by the storage module 250, or any suitable combination thereof.

The unified signal module 220 is configured to access price data, incentive data, customer preference data, or any suitable combination thereof and, based on the accessed data, to generate a unified signal. The control module 230 uses the unified signal to control one or more DERs. For example, a heating/cooling schedule may be sent via the communication module 210 and the network 160 to a device 190.

The user interface module 240 is configured to provide user interfaces for receiving customer preferences, providing savings data, providing price data, providing schedule data, or any suitable combination thereof. For example, one or more of the user interfaces of FIGS. 3-5 may be presented by the user interface module 240. The storage module 250 is configured to store data regarding customers, utilities, incentives, prices, temperatures, carbon offsets, or any suitable combination thereof.

Figure 3:
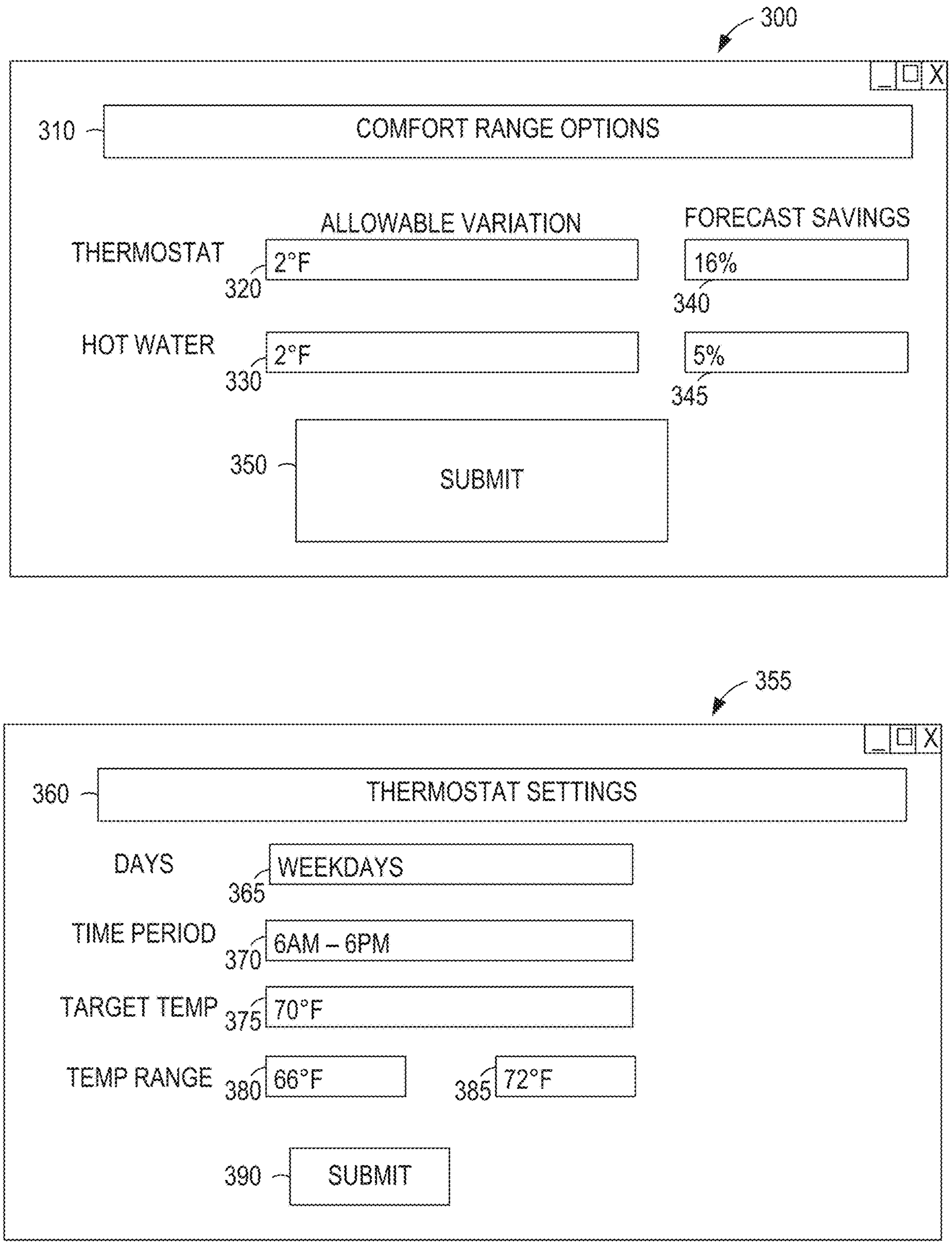
FIG. 3 is a block diagram illustrating example user interfaces for setting comfort range options for use in distributed energy resource optimization with unified incentives, according to some example embodiments.

FIG. 3 is a block diagram illustrating example user interfaces 300 and 355 for setting comfort range options for use in distributed energy resource optimization with unified incentives, according to some example embodiments. As can be seen in FIG. 3, the user interface 300 includes a title 310, input fields 320 and 330, informational fields 340 and 345, and a button 350. By way of example and not limitation, the user interface 300 is generated by the user interface module 240 (of FIG. 2) of the optimization server 110 (of FIG. 1) and displayed on a display device of a user device 130 (also of FIG. 1).

The user interface 300 may be displayed to a user configuring customer preferences. The title 310 indicates that the user interface is for setting comfort range options.

The input field 320 is operable to provide an allowable temperature variation for a thermostat. The customer may use an interface of the thermostat to set a schedule for target temperature (e.g., to cool to 70° F. between 6 pm and 8 am while residents are at home and to only cool to 78° F. between 8 am and 6 pm while residents are at work). In combination, the thermostat schedule and the allowable variation define a schedule for an acceptable temperature range (e.g., 68° F.-72° F. during the evening and 76° F.-80° F. during the day).

An allowable temperature variation for a hot water heater is received via the input field 330. The customer may use an interface of the hot water heater to set a target temperature for hot water (e.g., 105° F.). In combination, the target hot water temperature and the allowable variation define an acceptable temperature range (e.g., 103° F.-107° F.). In this example, the schedule for the acceptable temperature range of hot water produced by the hot water heater does not change over time.

Based on the schedule for the condition (e.g., temperature) of the device and a unified price signal, the optimization server 110 determines a schedule for use of the device. Using historical power consumption data for the device, the optimization server 110 may forecast savings to be generated by applying the allowable variation indicated in the input fields 320 and 330. The forecast savings may be presented in the informational fields 340 and 345. For example, by increasing the allowable variation in the fields 320 and 330, the forecast savings shown in the informational fields 340 and 345 may increase.

The button 350 may be operable to submit the customer preferences in the input fields 320 and 330 to the optimization server 110 for storage by the database server 120. Thereafter, the control module 230 may control scheduling of one or more DERs of the customer, based on the customer preferences and a unified signal generated by the unified signal module 220.

In the example of the user interface 300, the user sets a single allowable variation value, defining an acceptable temperature range that is symmetric around the target value. The user interface 350 includes options for setting minimum and maximum values that are not symmetric around the target value.

As can be seen in FIG. 3, the user interface 355 includes a title 360; input fields 365, 370, 375, 380, and 385; and a button 390. By way of example and not limitation, the user interface 300 is generated by the user interface module 240 (of FIG. 2) of the optimization server 110 (of FIG. 1) and displayed on a display device of a user device 130 (also of FIG. 1).

The user interface 355 may be displayed to a user configuring customer preferences for a thermostat. For example, a first user interface may provide a user with a list of DERs. The user selects a thermostat from the list and, in response, the user interface 355 is presented. Similar user interfaces may be presented for other DERs.

The title 360 indicates that the user interface is for defining thermostat settings. The input fields 365-375, together, define a target temperature for a time period of certain days. The input field 365 may accept a specific date range (e.g., Jan. 1, 2024-Jan. 8, 2024), specific days of the week (e.g., Mondays, Wednesdays, and Fridays), predefined day ranges (e.g., weekdays defined as Monday-Friday, weekends defined as Saturday-Sunday, and the like), or any suitable combination thereof. The input field 370 may accept a specific time range (e.g., 6 AM to 6 PM), predefined time ranges (e.g., day defined as 6 AM to 6 PM, night defined as 6 PM to 6 AM, and the like), or any suitable combination thereof.

The input field 375 accepts a target temperature for the defined time period. The input fields 380 and 385 accept minimum and maximum acceptable temperatures for the defined time period. In this example, the minimum acceptable temperature is 4° F. below the target temperature of 70° F. and the maximum acceptable temperature is 2° F. above the target temperature. Accordingly, the user interface 355 may be used to submit a temperature range that is asymmetric about the target temperature. The button 390 may be operable to submit the settings shown in the user interface 355.

Elements of the user interfaces 300 and 355 may be combined. For example, the user interface 300, showing settings for multiple DERs, may include the asymmetric range features of the user interface 355 for each DER. As another example, the user interface 355 may include the forecast savings features of the user interface 300.

Figure 4:
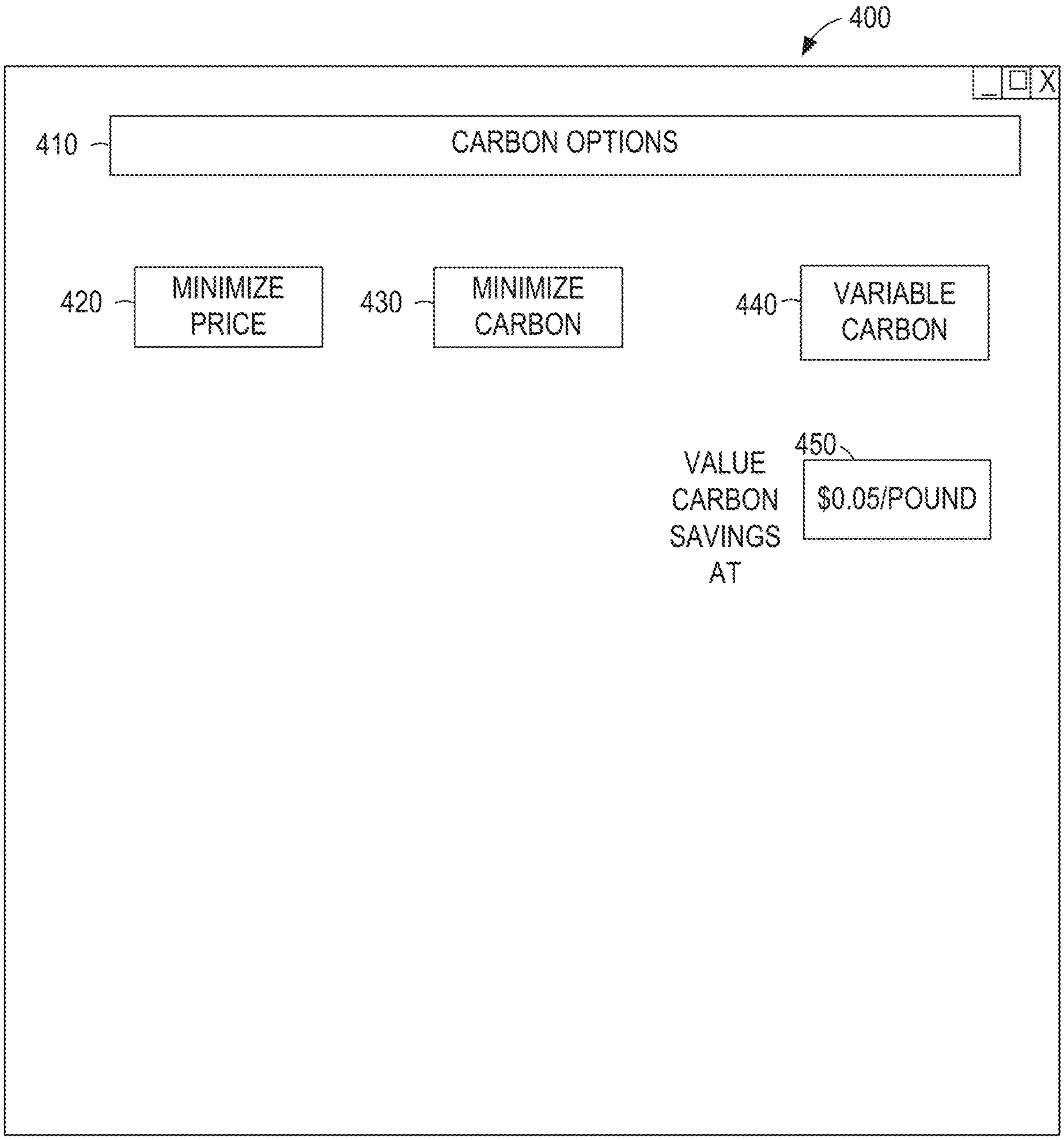
FIG. 4 is a block diagram illustrating a user interface for setting carbon options for use in distributed energy resource optimization with unified incentives, according to some example embodiments.

FIG. 4 is a block diagram illustrating a user interface 400 for setting carbon options for use in distributed energy resource optimization with unified incentives, according to some example embodiments. As can be seen in FIG. 4, the user interface 500 includes the title 410; buttons 420, 430, and 440; and an input field 450. As can be seen by the title 410, the user interface 400 may be displayed to allow a customer to set carbon preferences. By way of example and not limitation, the user interface 400 is generated by the user interface module 240 (of FIG. 2) of the optimization server 110 (of FIG. 1) and displayed on a display device of a user device 130 (also of FIG. 1).

The button 420 is operable to set a customer preference to minimize the price paid for power, regardless of the carbon generated. The button 430 is operable to set a customer preference to minimize the carbon generated, regardless of the price. The input field 450 receives a user selection or input of a value for carbon generation. The button 440 is operable to set a customer preference to prefer lower-carbon power, but to accept higher-carbon power if the additional price paid to reduce carbon generation exceeds the amount set in the input field 450.

Thus, in the example of FIG. 4, a selection of variable carbon (via the button 440) would provide a preference that low-carbon power sources (e.g., wind, solar, hydro, geothermal, and the like) be used in place of high-carbon power sources (e.g., fossil fuels) unless the carbon savings is outweighed by a price increase, where the carbon savings is valued at $0.05 per pound (as shown by the input field 450).

Figure 5:
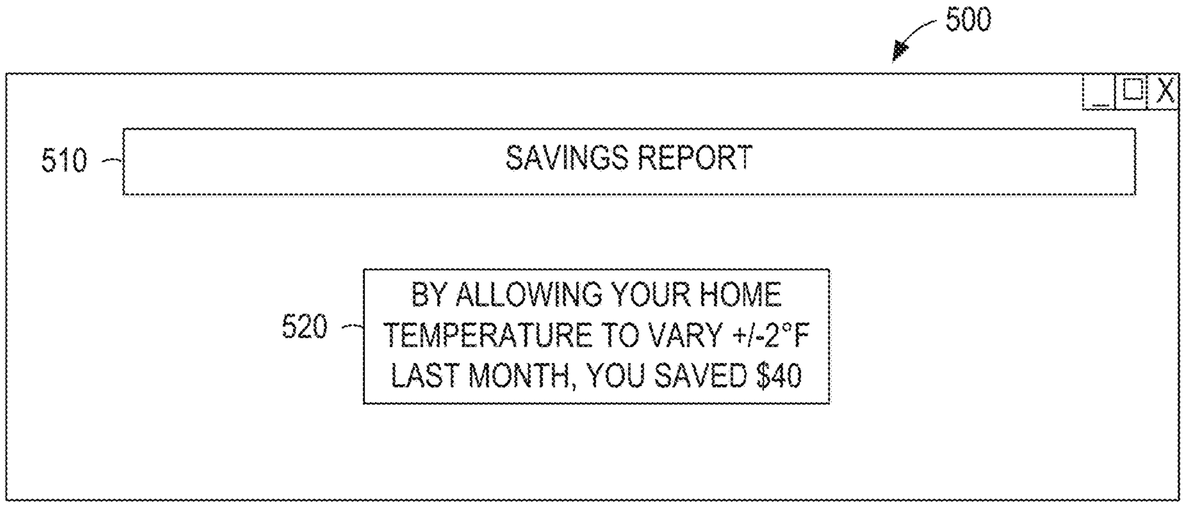
FIG. 5 is a block diagram illustrating a user interface for reporting savings resulting from distributed energy resource optimization with unified incentives, according to some example embodiments.

FIG. 5 is a block diagram illustrating a user interface 500 for reporting savings resulting from distributed energy resource optimization with unified incentives, according to some example embodiments. The user interface 500 includes a title 510 and an informational message 520. The title 510 indicates that the user interface 500 provides a savings report. By way of example and not limitation, the user interface 500 is generated by the user interface module 240 (of FIG. 2) of the optimization server 110 (of FIG. 1) and displayed on a display device of a user device 130 (also of FIG. 1).

The informational message 520 indicates a savings (in this case, $40) that resulted from applying a schedule generated by the optimization server 110 based on the customer preferences. By allowing the temperature to vary by 2° F. from the target temperature, the optimization server 110 was able to generate a schedule that shifted power consumption from high-cost times to lower-cost times, reducing the total power costs and increasing the effectiveness of utility, wholesale marketplace, and government incentive programs.

FIGS. 6-9 are block diagrams illustrating a database schema 600 suitable for use by the optimization server in optimizing energy resource consumption, according to some example embodiments. The database schema 600 includes, in FIG. 6, a customer table 610, a ZIP table 640, and a rate table 670. The customer table 610 is defined by a format 620, including a user identifier field, a name field, an address field, and a ZIP code field. The customer table 610 includes rows 630A, 630B, and 630C. The ZIP table 640 is defined by a format 650, including a ZIP code field and a utility identifier field. The ZIP table 640 includes rows 660A, 660B, and 660C. The rate table 670 uses a format 680 and includes a utility identifier field, a start time field, an end time field, and a rate field. The rate table 670 includes rows 690A, 690B, and 690C.

Each of the rows 630A-630C stores information for a user. The user identifier field stores a unique identifier for the customer. The name field stores a name of the customer. The address and ZIP code fields store an address and ZIP code of the customer. In various example embodiments, additional or different fields are stored in the customer table 610. For example, a phone number field, a solar power field, or any suitable combination thereof may be stored.

The ZIP table 640 may be used to determine the utility that provides power for a customer by cross-referencing the ZIP code field in the customer table 610 with the ZIP code field in the ZIP table 640. In this example, Adam Smith, in ZIP code 90210, is served by utility 0001; John Jay and James Wilson, in ZIP codes 95209 and 97123, are served by utility 0002. Often, each utility sets its own rates, so the utility identifier can be used to determine the rate schedule for a customer by cross-referencing the utility identifier with the rate table 670. A utility may use different rates for different ZIP codes, cities, states, or addresses, in which case more or different fields may be used in the customer table 610, the ZIP table 640, the rate table 670, or any suitable combination thereof.

The rate table 670 may be used to store rate information. The row 690A shows that, on Jan. 1, 2024 from midnight to 5:00 AM, utility 0001 charged $0.12/kWh for electricity. From 5:00 AM to 6:00 AM, the price increased to $0.15/kWh, as shown by the row 690B. The row 690C shows that utility 0002 charged $0.22/kWh for power from midnight to 3:00 AM on the same date.

The rate table 670 may store historical and future rate information. For example, future rates may be provided by a utility at an hourly or quarter-hourly granularity a day, two days, three days, a week, or a month ahead of time.

FIG. 7 shows a demand response table 710 and a utility fuel table 740. The demand response table 710 uses a format 720 and includes rows 730A, 730B, and 730C. As indicated by the format 720, each of the rows 730A-730C includes a utility identifier, a start time, an end time, a reduction credit value, and a DER management system (DERMS) payment value. The utility fuel table 740 uses a format 750 and includes rows 760A, 760B, 760C, 760D, 760E, 760F, 760G, and 760H. As indicated by the format 750, each of the rows 760A-760H includes a utility identifier, a start time, an end time, a fuel name, and a percentage.

The row 730A of the demand response table 710 shows that utility 0001 offers a credit of $0.04/kWh for reduced power consumption during the time of 4 PM to 5:30 PM on Jan. 1, 2024. For example, the utility may have access to data indicating a historical average amount of power used by the customer during that time period. If the customer reduces power consumption relative to the historical average, not only will the customer pay less (because less electricity is purchased from the utility), but the utility will credit back to the customer $0.06 for each kWh foregone.

The row 730B of the demand response table 710 shows that, during the same time period of the following day (Jan. 2, 2024), the utility 0001 increases the credit to $0.05/kWh. The row 730C shows that the utility 0002 is providing an $0.06/kWh reduction credit from 2 PM-6 PM on Jan. 1, 2024.

In addition to crediting the rate payer for the reduced power consumption, the utility may also provide a direct payment to the DERMS managing the DERs of the rate payer. In the example of FIG. 7, the DERMS payment for each kWh reduced according to the utilities' demand response schedule is $0.03/kWh, $0.04/kWh, or $0.05/kWh.

In the demand response table 710, both the reduction credit and the DERMS payment are shown as per-kWh values. In some example embodiments, the rewards from the utility are paid as a flat rate per month, season, or year. For example, the rate-payer may receive a $75 rebate at the end of the billing year if at least a minimum number (e.g., 10) of power consumption reduction events are participated in. The DERMS may receive a $50 payment for each complying rate payer whose DERs are managed by the DER. In such embodiments, each power consumption reduction event may be defined by a start time, an end time, and an amount of power reduction required to participate in the event. The amount of power reduction may be specified as a percentage (e.g., 10%) or a value (e.g., 10 kWh).

Utilities generate power using different sources. Renewable power may be preferred, but be less consistent. Fossil fuels are available on demand, but may be more expensive or generate more carbon. As a result, the fuel mix used by a utility varies over time. Each of the rows 760A-760H indicates, for an identified utility and period of time, a percentage of the power generated by that utility by a particular fuel. For example, taken together, the rows 760A-760C show that from midnight to 6 AM on Jan. 1, 2024, utility 0001 generates half of its electricity from oil, a quarter from natural gas, and a quarter from hydro power.

No solar power is available night, but during the day, from 6 AM-6 PM, solar power accounts for 50% of the power generation, as shown in the row 760H. Hydro power continues to provide 25%, per the row 760G, but oil and natural gas consumption are both reduced, as shown in the rows 760E and 760F.

FIG. 8 shows a fuel carbon table 810, a non-net metered solar table 840, and a wholesale table 870. The fuel carbon table 810 uses a format 820 and includes rows 830A, 830B, and 830C. The non-net metered solar table 840 uses a format 850 and includes rows 860A, 860B, 860C, and 860D. The wholesale table 870 uses a format 880 and includes rows 890A, 890B, and 890C.

Each row of the fuel carbon table 810 shows an amount of carbon generated when using an identified fuel to produce electricity. For example, the row 830A shows that oil generates 2.38 pounds of carbon dioxide for each kWh of electricity generated. The row 830B shows that natural gas generates 0.97 pounds of carbon dioxide for each kWh. The row 830C shows that hydro power does not generate carbon dioxide.

The fuel carbon table 810 shows a single value for oil and natural gas, but greater precision may be used. For example, different grades of oil may generate different amounts of carbon dioxide. As another example, power plants may use carbon mitigation strategies that reduce emissions. These mitigation strategies may be handled by using a different fuel type in the utility fuel table 740 (e.g., "mitigated coal") and storing different carbon values in the fuel carbon table 810 for the mitigated and unmitigated versions of the fuel.

By combining data from the utility fuel table 740 and the fuel carbon table 810, an amount of carbon generated by a utility for each kWh of power generated can be determined. For example, while utility 0001 is using a 50% oil, 25% natural gas, 25% hydro mix (as indicated by the rows 760A-760C of the utility fuel table 740), an average of 1.4325 pounds of carbon is produced for each kWh. Later, when utility 0001 is using 50% solar power and only 25% fossil fuels, the average carbon generation drops to 0.3835 pounds per kWh. Accordingly, carbon production can be reduced by delaying power consumption until solar power is available.

A customer may have the option to select from multiple sources of power. For example, the ZIP table 640 may include multiple rows for a single ZIP code or otherwise indicate that a single customer can purchase power from multiple utilities. Then, the customer is enabled to select a lowest-priced utility using the rate table 670, to select a lowest-carbon utility by determining a carbon production for each utility and comparing them, or to select a utility by determining if a higher price for lower carbon production is acceptable.

As another example, a single utility may provide multiple options to its customers. For example, the rate table 670 may include a fuel column and charge different rates depending on the fuel. As a result, the customer is enabled to select a lowest-price fuel, to select a lowest-carbon fuel, or to select a fuel by determining if a higher price for lower carbon production is acceptable.

Each of the rows 860A-860C stores a value of solar power for an identified utility during an identified time period. The value of solar power may be lower during peak solar power generation than at other times. In the example of FIG. 8, the utility 0001 pays $0.08/kWh for solar power between 6 PM and 6 AM, and only $0.04/kWh for solar power between 6 AM and 6 PM. Since the price paid by the utility for solar power is often less than the price charged by the utility for power from the grid (shown in the rate table 670) are often not equal, a customer may prefer to use self-generated solar power rather than alternating between selling power to the utility and buying power from the utility.

A wholesale power market may pay customers for reduced power consumption. For example, if power consumption exceeds supply, rolling blackouts, or "brownouts" may result. To avoid this, either production needs to increase or demand needs to be reduced. A regular power consumer may contribute to the stability of the power grid by voluntarily reducing consumption. A regional power management organization may manage a wholesale market and facilitate wholesale sales of electricity and incentives for reduction. Examples of such organizations include the California Independent System Operator (CAISO), the Electric Reliability Council of Texas (ERCOT), and the Midcontinent Independent System Operator (MISO). For convenience, such organizations will be referred to herein as ISOs. A relationship between a customer and an ISO may be stored by using an additional column in the ZIP table 640, by storing a relationship between utilities and ISOs in a utility table, or any suitable combination thereof.

As can be seen by consideration of the rate table 670, the demand response table 710, the non-net metered solar table 840, and the wholesale table 870, the effective cost of power is not simply the rate paid to the utility for the power. Accordingly, the optimization server 110 uses the data from the database schema 600 to determine a unified price signal for a customer. Based on the unified price signal and the customer preferences, the optimization server 110 determines a schedule for power consumption by one or more DERs of the customer. Using the determined schedule, the customer saves money, reduces carbon generation, or both, without substantial loss of comfort.

The optimization server 110 or the database server 120 may populate the data in the database schema 600 by dynamically aggregating real-time data from multiple sources (such as the utility server 170, the regional server 180, a weather forecasting server, and other servers) including energy prices, grid demands, and environmental conditions. In some example embodiments, the intervals at which the real-time data from each source is updated is determined by the volatility and temporal relevance of each source. For example, the ZIP table 640 may be updated daily or weekly to check for changes, but does not need to be updated more often because the coverage area of utilities does not change often. As another example, the wholesale table 870 may be updated hourly or even more frequently, since the wholesale price for power may change due to actions by other market participants.

FIG. 9 shows a device table 910, a thermostat table 940, and a customer solar table 970. The device table 910 uses a format 920 and includes rows 930A, 930B, and 930C. The thermostat table 940 uses a format 950 and includes rows 960A, 960B, and 960D. The customer solar table 870 uses a format 980 and includes rows 990A, 990B, and 990C.

Each DER for a rate payer is controlled separately. The device table 910 links the controlled devices to the rate payer. In the example of FIG. 9, the rows 930A-930C of the device table 910 show three devices for the user 1234. Each device has a unique device identifier and a device type. Each device type may have a separate table for device-specific information, such as the thermostat table 940 which includes thermostat-specific data.

The thermostat table 940 includes data for each thermostat device of the device table 910. In the example of FIG. 9, only three rows are shown. The rows 960A-960C show target, minimum, and maximum temperatures for the thermostat A1 during three time periods.

The customer solar table 970 stores estimated solar power production and based line power consumption values for customers. In the example of FIG. 9, a single daytime value for solar production is stored for each customer. In other example embodiments, weather forecasts may be used to generate expected solar production values for each day. The daytime non-DER consumption value is a historical average (or other estimate) of the rate of power consumption during periods in which solar power is generated, excluding the power consumption of DERs. Thus, the difference between the daytime solar value and the daytime non-DER consumption value is the typical amount of power imported or exported by the identified customer, excluding the consumption of power by DERs.

For example, customers 1234 and 3456 typically consume much more power than they produce. Accordingly, all power used by DERs for these customers will be imported from the power grid. However, customer 2345 produces 300 W more than is consumed. As a result, the first 300 W used by DERs will be locally generated (and if less than 300 W is used, the excess will be exported) and any additional power consumed will be imported.

Figure 10:
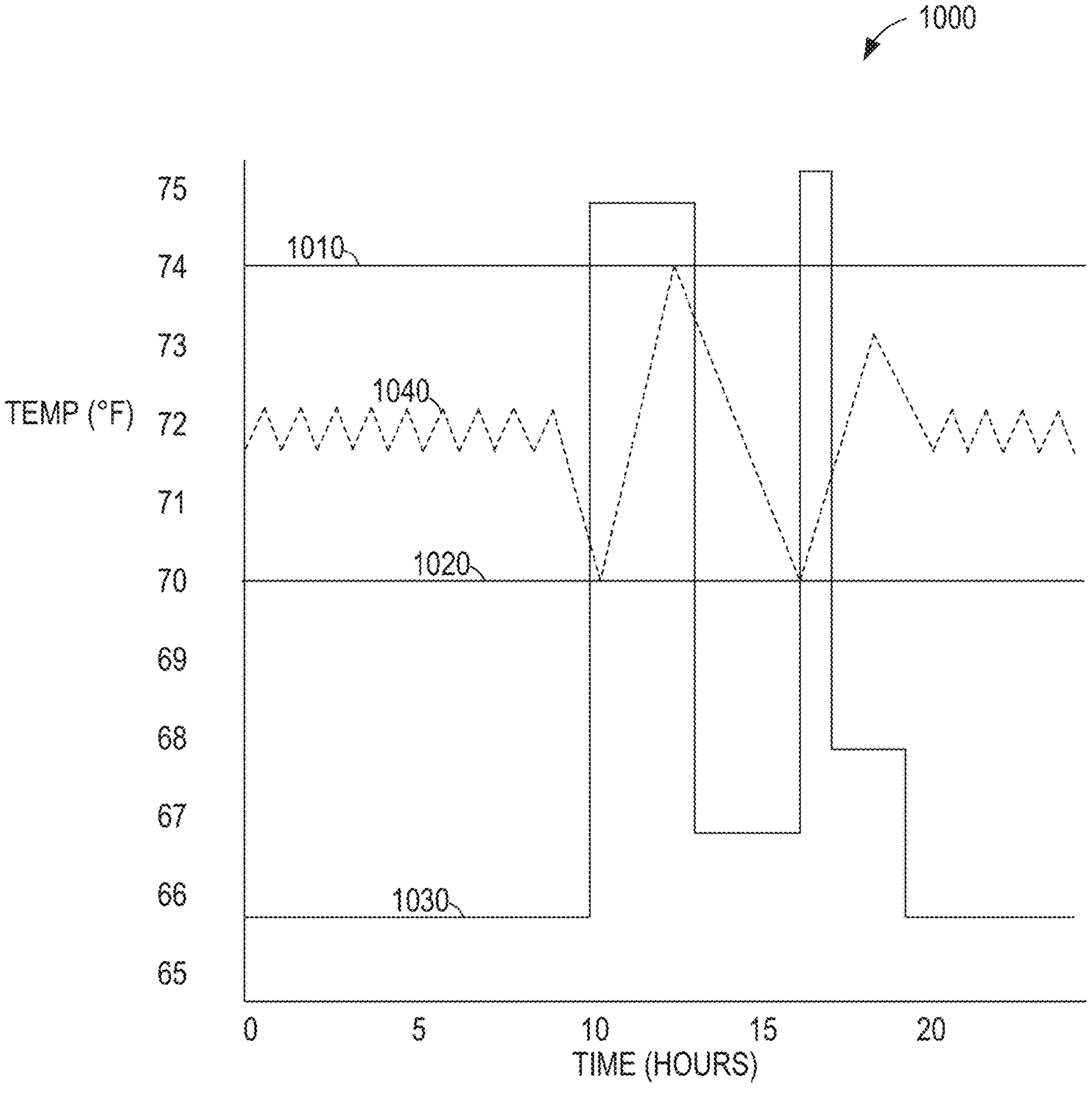
FIG. 10 shows a graph of temperature as a function of time when using distributed energy resource optimization with unified incentives, according to some example embodiments.

FIG. 10 shows a graph 1000 of temperature as a function of time when using distributed energy resource optimization with unified incentives, according to some example embodiments. The graph 1000 includes temperature bounds 1010 and 1020, a price signal 1030, and a temperature 1040 controlled by a thermostat DER.

The price signal 1030 shows that the price signal is low before 10 AM and after 7 PM. Between 10 AM and 7 PM, the price signal is relatively low from about 1 PM to 4 PM. While the price signal is low, the temperature 1040 is kept close to a target temperature of 72° F. Before the price signal rises at 10 AM, the temperature 1040 is reduced to near the minimum temperature bound 1020. While the price signal is high, the temperature 1040 is allowed to rise to the maximum temperature bound 1010 before cooling is performed again. As a result, the amount of power consumed by the thermostat DER during the period of the high price signal is reduced without allowing the temperature to exceed the maximum acceptable temperature defined by the customer.

Figure 11:
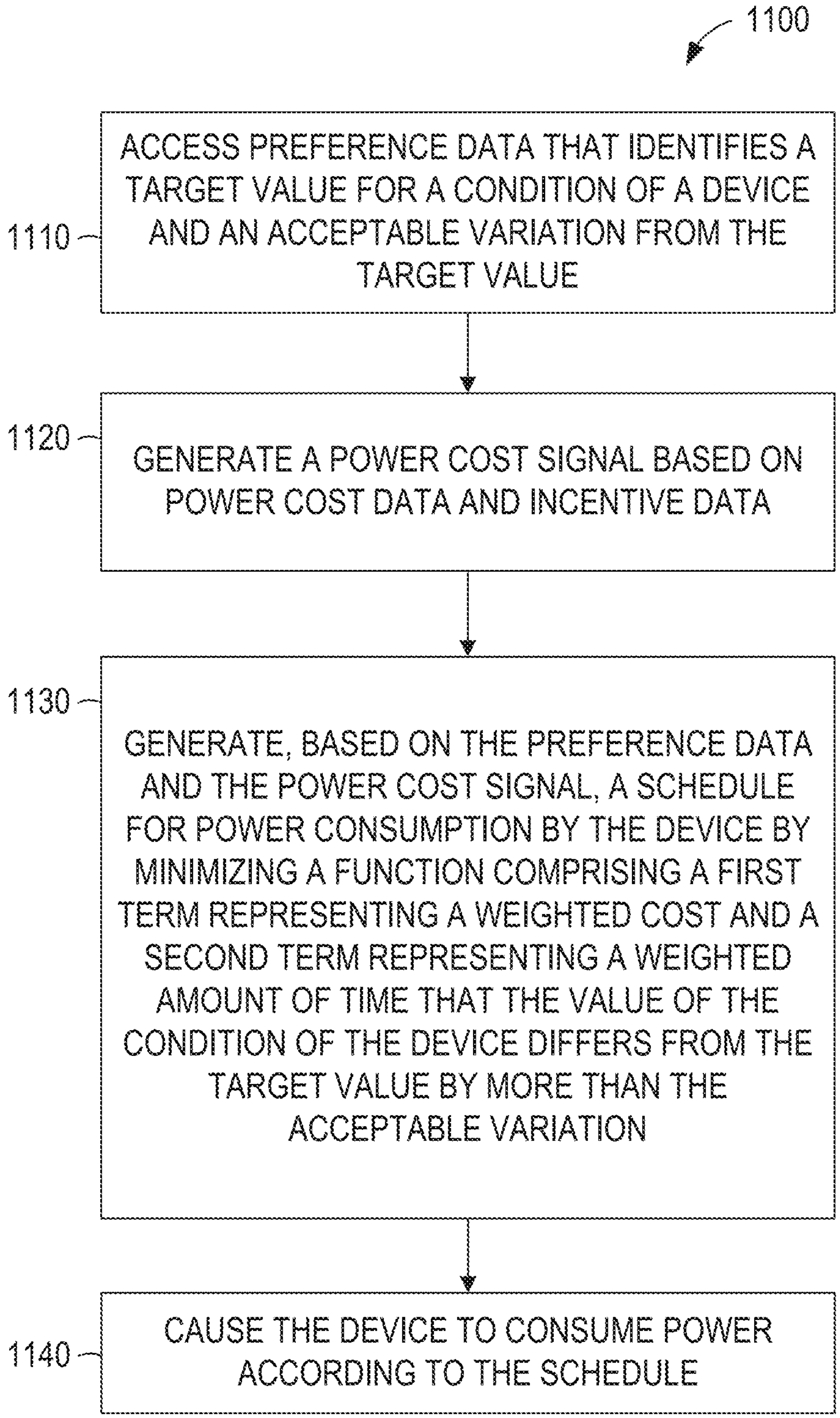
FIG. 11 is a flowchart illustrating operations of a computing device in performing a method of distributed energy resource optimization with unified incentives, according to some example embodiments.

FIG. 11 is a flowchart illustrating operations of a computing device in performing a method 1100 of distributed energy resource optimization with unified incentives, according to some example embodiments. By way of example and not limitation, operations in the method 1100 are described as being performed by the optimization server 111, using modules described above with respect to FIG. 2, the user interfaces of FIGS. 3-5, and the database schema of FIGS. 6-9.

In operation 1110, the unified signal module 220 accesses preference data that identifies a target value for a condition of device and an acceptable variation from the target value. For example, preference data received via the user interface 300 may be stored in a database table and accessed by the unified signal module 220. The device may be an air-conditioning unit, a heating unit, a hot-water heater, a home or electric-vehicle battery, or another DER. The target value for the condition of the device relates to the purpose for which power is consumed by the device. For example, the value for the condition of an air-conditioning unit or a heating unit may be an ambient temperature. The value for the condition of a hot-water heater may be a temperature of water. The value for the condition of a battery may be a charge level of the battery.

Similarly, the acceptable variation from the target value may be measured as a percentage (e.g., within 10% of the target) or in the units of the target value (e.g., +/−2° F. when the target value is 75° F.). Thus, in some example embodiments, the target value is a target temperature for heating or cooling and the acceptable variation from the target value defines an acceptable temperature range.

The preference data may also include a value for variation beyond the acceptable variation. For example, a customer may allow the temperature to increase beyond the acceptable variation to avoid purchasing power that is double the normal price by indicating the value for variation beyond the acceptable variation is 100% of normal price. In some example embodiments, the value for variation beyond the acceptable variation is a function of the amount of variation. For example, the customer may be willing to accept an extra 1° F. of temperature (beyond the allowable variation) to avoid purchasing power at double normal price, but be unwilling to accept 2° F. beyond the allowable variation so long as power is available at less than triple the normal price.

The unified signal module 220 generates, in operation 1120, a power cost signal based on power cost data and incentive data. The power cost signal may be generated at with a granularity of hourly, quarter-hourly, minute-level, or other suitable duration. Utility, ISO, wholesale market data, and the like may be accessed based on a location of the device. The customer table 610 may be used to determine the location of the device (e.g., by address or ZIP code). The power cost signal may be determined by adding the costs (e.g., per-kWh costs and penalties for excess consumption or peak demand consumption) and subtracting the incentives (e.g., payments from utilities or ISOs for reduced peak consumption).

The power cost data may be generated, in whole or in part, by dynamically aggregating real-time data from multiple sources including energy prices, grid demands, and environmental conditions.

In some example embodiments, the generating of the power cost signal is further based on carbon production data. For example, the preference data may identify a carbon cost value. Based on carbon production data provided by the power generating utility or derived from available data (e.g., from the fuel mix accessed from the utility fuel table 740 and the resulting carbon generation determined from the fuel carbon table 810), an amount of carbon generated per kWh consumed can be determined. The carbon cost value is combined with the power cost data and incentive data to determine a subjective power cost signal. For example, a customer that places a penalty of $0.25/pound of carbon would use a power cost signal that incorporates that penalty when the power supply generates carbon even though the actual cost does not include that penalty.

The incentive data may include carbon credit incentive data. For example, the customer may be allocated a carbon cap or carbon intensity (allowable rate of carbon production) in the form of carbon credits. By reducing total or peak power consumption, the customer may use less carbon (or produce carbon at a lower carbon intensity) than allowed. Another entity may offer to purchase the unused carbon credits from the customer. Accordingly, the price signal may include the value of receiving payment for carbon credits.

Utility demand response incentive data may be included in the incentive data. The utility may identify a period of time in which demand exceeds a predetermined threshold and request some or all customers to reduce their power consumption during the period of time. For example, the customer may receive a discount to all electricity purchases for the month if power consumption is reduced by 20% during time periods identified by the utility as having peak demand. As a result, the effective price of maintaining power consumption during those time periods is substantially more than the apparent per-kWh cost at that time.

The power cost signal may be based on whether, and how much, solar power is produced by the customer or at a location of the device. If the utility purchases solar power at the same rate that the utility charges for power, a solar power signal may not be needed, since the cost of consuming more power than is produced and the benefit of producing more power than is consumed are equal. However, if the utility does not net meter solar, the customer receives a lower payment for excess solar power generation than the customer pays for consuming additional power. As a result, the opportunity cost for using additional kWh up to the amount produced locally is the lower rate (e.g., $0.08/kWh if the row 860A of the non-net metered solar table 840 applies) while the cost for additional kWh beyond that amount is a higher rate (e.g., $0.12/kWh if the row 690A of the rate table 670 applies).

In operation 1130, the control module 230 generates, based on the preference data and the power cost signal, a schedule for power consumption by the device. The generating of the schedule includes minimizing a function that comprises a first term representing a weighted cost and a second term representing a weighted amount of time that the value of the condition of the device differs from the target value by more than the acceptable variation. The schedule may be generated at the same granularity as the power cost signal.

The control module 230 causes the device to consume power according to the schedule (operation 1140). For example, the control module 230 may cause the communication module 210 to send the schedule to the device 190 or to the control server 185 that controls the device 190. By using the method 1100 to control multiple DERs of multiple customers, the optimization server 110 may optimize energy usage across a network of interconnected devices (e.g., DERs) to enhance overall energy efficiency and achieve cost-effectiveness at a system-wide level (e.g., across a utility, an ISO, a county, a state, or a country).

Thereafter, the device 190 operates according to the schedule, improving the efficiency of power consumption by the device as compared to a schedule that merely maintains the target value for the device without considering the power cost signal. Taking greater advantage of the rate schedule, wholesale price incentives, rebates, and so on that are designed to alter when power is used in order to better maintain power infrastructure, increase relative use of renewable energy, and the like, provides advantages to the customer that uses the optimization server that implements the method 1100, and also to the utility serving the customer and other customers of the utility.

Communication from the control module 230 to the device 190 or the control server 185 may be accomplished using one or more of the following standards: Matter Protocol, Z-Wave, Zigbee, Thread, WiFi, Bluetooth, PoE, OpenADR, and IEEE 2030.5. Communication from the control module 230 to the device 90 or the control server 185 may be accomplished using any one or more of the proprietary solutions developed by: Telematica, Enode, DERAPI, and Smartcar. Other communication methods also may be used.

An example formulation for determining a schedule is:

$$\begin{aligned}
\min\quad & w_1 \sum_{t \in \mathcal{T}} c_t + w_2 \sum_{t \in \mathcal{T}} T_t^{penalty} + w_3 T_{|\mathcal{T}|}^{penalty} \\
\text{s.t.}\quad & T_1 = \overline{T}_1 \\
& c_t = P_t(x_t^c \alpha) \\
& T_{t+1} = T_t - x_t^c q_c + d_t\left(1 + \beta \frac{\hat{T}_{max} - T_t}{\hat{T}_{max} - \hat{T}_{min}}\right) \\
& T_t^{penalty} \geq 0 \\
& T_t^{penalty} \geq T_t - (T^{target} + T_{offset}) \\
& T_t^{penalty} \geq \left(T_t^{target} - T_{offset}\right) - T_t \\
& T_t^{min} \leq T_t \leq T_t^{max} \\
& 0 \leq x_t^c \\
& 0.7 x_t^{on} \leq x_t^c \leq 1.0 x_t^{on} \\
& x_t^{on} \in \{0, 1\}
\end{aligned}$$

Decision Variables:

$x_t^c$- fraction of on time by AC at time t $T_t$-temperature of building at time t $c_t$-cost of operating the thermostat at time t $x^o n_t$-whether the AC is turned on at time t $v_t$-dummy variable equal to $T_t$ if $x_t^{on} = 1$, else equal to 0

Paramaters $\overline{T}_1$-Initial temperature of the room $P_t$-price per kilowatt hour at time t $q_c$-cooling rate $\alpha$-conversion factor from on time to kwh $\beta$-conversion factor for temperature efficiency to kwh $d_t$-how much the temperature naturally changes at time t $T_{target}$-target temperature $T_{offset}$-temperature offset $T_{min}$-minimum allowable room temperature $T_{max}$-maximum allowable room temperature In the formulation above, the optimization server 110 finds a schedule for a period of time T. The first line shows the function being minimized. The remaining lines show the conditions that must be met. Thus, the value of the function is minimized, "subject to" the additional restrictions. The terms of the function are weighted using weights $w_1$, $w_2$, and $w_3$. Selection of different values for the weights results in different schedules. For example, a very high value for $w_2$ may ensure that the schedule never allows the temperature to exceed the bounds specified by the customer preferences. In some example embodiments, the value of the weights is part of the customer preference data. In addition, the variables $\hat{T}_{max}$ and $\hat{T}_{min}$ are used for scaling the disturbance term, $d_t$ and help capture thermodynamics of the home. β is a parameter multiplied by a function of these terms and the temperature which serves to increase the disturbance at lower temperatures. Here, the disturbance term is assumed to be positive (i.e., the home is naturally heating up).

The value of $c_t$ for each time sub-period t in T is the cost for operation of the DER during that sub-period. For example, if the schedule is being generated with a one-hour granularity, twenty-four hours at a time, then $t \in T$ refers to each hour in the twenty-four hour period and $c_t$ is the cost of operation during hour t. Accordingly, the first term in the function being minimized is a weighted term for the total cost of operation.

In this example, the condition of the DER being configured is a temperature and the customer's acceptable range is defined as being symmetric around the target temperature. Such data may be accessed from the thermostat table 940. The temperature at time t is indicated as $T_t$. During each time period that the customer's target temperature is not met, a penalty value is determined. Thus, the second term in the function being minimized is a weighted term for the customer's preferences not being met. The middle three lines, beginning with $$T_t^{penalty},$$

define the value for the penalty in each time period. The maximum acceptable temperature during time period t is $$T_t^{target} + T_{offset}.$$

The minimum acceptable temperature during time period t is $$T_1^{target} -$$

$T_{offset}$. While $T_t$ is within the target range, the right-hand side of the second and third penalty equations will be negative. In that case, the first condition, that $$T_t^{penalty}$$

be greater than zero, will force $$T_t^{penalty}$$

to 0. While $T_t$ is outside the target range, $$T_t^{penalty}$$

will be equal to the magnitude of the excess.

$T_{max}$ and $T_{min}$ are set to outer temperature boundaries that may not be exceeded. For example, $T_{min}$ may be 60° F. and $T_{max}$ may be 90° F. These values may be set by the customer or by the optimization server 110 to default values.

The final term in the function being minimized is an additional penalty for the final time period (e.g., the last hour of the day being scheduled). This term helps with a smooth transition from one schedule to the next.

Alternative formulations are possible. For example, in the formulation below, the function being minimized remains the same, but the conditions are modified to support non-net metering with solar.

$$\begin{aligned}
\min\quad & w_1 \sum_{t\in\mathcal{T}} c_t + w_2 \sum_{t\in\mathcal{T}} T_t^{penalty} + w_3 T_{|\mathcal{T}|}^{penalty} \\
\text{s.t.}\quad & T_1 = \overline{T}_1 \\
& c_t = P_t p_t^{import} + P_t^{export} p_t^{solar} \\
& x_t^c \alpha = p_t^{import} + p_t^{solar} \\
& T_{t+1} = T_t - x_t^c q_c + d_t\left(1 + \beta\frac{\hat{T}_{max} - T_t}{\hat{T}_{max} - \hat{T}_{min}}\right) \\
& T_t^{penalty} \geq 0 \\
& T_t^{penalty} \geq T_t - (T^{target} + T_{offset}) \\
& T_t^{penalty} \geq \left(T_t^{target} - T_{offset}\right) - T_t \\
& T_t^{min} \leq T_t \leq T_t^{max} \\
& p_t^{solar} \leq \overline{p}_t^{solar} \\
& 0 \leq x_t^c,\ p_t^{import},\ p_t^{solar} \\
& 0.7 x_t^{on} \leq x_t^c \leq 1.0 x_t^{on} \\
& x_t^{on} \in \{0, 1\}
\end{aligned}$$

Decision Variables:

$$x_t^c -$$

fraction of on time by AC at time t $T_t$-temperature of building at time t $C_t$-cost of operating the thermostat at time t $x^o n_t$-whether the AC is turned on at time f $$p_t^{solar} -$$

excess solar power available at time t $$p_t^{import} -$$

power being imported from the grid at time t

Paramaters $\ddot{T}_1$-Initial temperature of the room $$P_t^{import} -$$

price per kilowatt hour at time f $q_c$-cooling rate

α-conversion factor from on time to kwh $d_t$-how much the temperature naturally changes at time t β-factor for dependency of disturbance on $T_t$ $T_{target}$-target temperature $T_{offset}$-temperature offset $T_{min}$-minimum allowable room temperature $T_{max}$-maximum allowable room temperature $$P_t^{export}\text{-}$$

price for exporting solar power at time t $$\overline{P}_t^{solar}\text{-}$$

excess solar power available at time t

In the equations above, elements marked as "import" refer to power imported to the customer (provided by the utility to the customer) and elements marked as "export" refer to power that would otherwise be exported (i.e., excess solar power after meeting other needs in the home) that could instead be used to power the AC. The price of the exported power, $$P_t^{export},$$

is the estimated price that the power would otherwise be sold for, and is likely lower than the price of importing electricity.

Whether power is imported or exported may be determined by consideration of the customer solar table 970.

Another alternative formulation is:

$$\begin{aligned}
\min\ & w_1\sum_{t\in\mathcal{T}} c_t + w_2\sum_{t\in\mathcal{T}} T_t^{penalty} + w_3 T_{|\mathcal{T}|}^{penalty} \\
\text{s.t.}\ & T_1 = \overline{T}_1 \\
& c_t = P_t(x_t^c\alpha) + \eta(\upsilon_t)P_t \\
& T_{t+1} = T_t - x_t^c q_c + d_t \\
& T_t^{penalty} \geq 0 \\
& T_t^{penalty} \geq T_t - (T^{target} + T_{offset}) \\
& T_t^{penalty} \geq \left(T_t^{target} - T_{offset}\right) - T_t \\
& \upsilon_t \leq T_t + x_t^{on} T_t^{min} - T_t^{min} \\
& \upsilon_t \geq T_t + x_t^{on} T_t^{max} - T_t^{max} \\
& T_t^{min} \leq T_t \leq T_t^{max} \\
& 0 \leq x_t^c,\ \upsilon_t \\
& 0.7x_t^{on} \leq x_t^c \leq 1.0x_t^{on} \\
& x_t^{on} \in \{0, 1\} \\
& \eta(\upsilon_t) := \frac{90-\upsilon_t}{60}
\end{aligned}$$

The formulation above penalizes cooling at lower temperatures over higher temperatures. The element $v_t$ uses a McCormick envelope that avoids a non-linear term.

$$\begin{aligned}
\min\ & \sum_{t\in\mathcal{T}} c_t \\
\text{s.t.}\ & T_1 = \overline{T}_1 \\
& c_t = P_t(x_t^c\alpha) \\
& T_{t+1} = T_t - x_t^c q_c + d_t\left(1 + \beta\frac{\hat{T}_{max} - T_t}{\hat{T}_{max} - \hat{T}_{min}}\right) \\
& T_t^{min} \leq T_t \leq T_t^{max} \\
& 0.7x_t^{on,c} \leq x_t^c \leq 1.0x_t^{on,c} \\
& x_t^{on,c} \in \{0, 1\}
\end{aligned}$$

In the formulation above, there is no term for $T_{penalty}$. Instead, in this formulation, $T_{min}$ and $T_{max}$ refer to the temperature range set by the customer and the temperature is not allowed to escape those bounds.

Another alternative formulation is:

$$\begin{aligned}
\min\ & \sum_{t\in\mathcal{T}} c_t \\
\text{s.t.}\ & T_1 = \overline{T}_1 \\
& c_t = P_t\left(x_t^h\alpha_h\right) \\
& T_{t+1} = T_t + x_t^h q_h + d_t\left(1 + \beta\frac{T_t - \hat{T}_{min}}{\hat{T}_{max} - \hat{T}_{min}}\right) \\
& T_t^{min} \leq T_t \leq T_t^{max} \\
& 0.7x_t^{on,h} \leq x_t^h \leq 1.0x_t^{on,h} \\
& x_t^{on,h} \in \{0, 1\}
\end{aligned}$$

Decision Variables:

$$x_t^c\text{-}$$

fraction of on time by AC at time t $T_t$-temperature of building at time t $C_t$-cost of operating the thermostat at time t $$x_t^{on,h}\text{-}$$

whether the heater is turned on at time t $$x_t^h\text{-}$$

how long the heater is turned on at time t

Paramaters $\overline{T}_1$-Initial temperature of the room $q_h$-heating rate $\alpha_h$-conversion factor from on time to kwh for heater $d_t$-how much the temperature naturally changes at time t β-factor for dependency of disturbance on $T_t$ $T_{target}$-target temperature $T_{offset}$-temperature offset.

$T_{min}$-minimum allowable room temperature $T_{max}$-maximum allowable room temperature This formulation is almost identical to the cooling problem, but with superscripts "h" for heating, $x_t^{on}$ refers to the heater being on, and there is a plus sign on $x_t^h q$ because this increases rather than decreases the temperature. In addition, the term multiplied by β causes the disturbance term to be larger for higher temperatures; under this heating formulation, the home is assumed to be naturally cooling.

Another alternative formulation is:

$$
\begin{aligned}
\min\ & w_1 \sum_{t \in \mathcal{T}} c_t + w_2 \sum_{t \in \mathcal{T}} T_t^{penalty} + w_3 T_{|\mathcal{T}|}^{penalty} \\
\text{s.t.}\ & T_1 = \overline{T}_1 \\
& c_t = P_t\left(x_t^{h,1}\alpha_1 + x_t^{h,2}\alpha_2\right) \\
& T_{t+1} = T_t + x_t^{h,1} q_{h,1} + x_t^{h,2} q_{h,2} + d_t\left(1 + \beta \frac{T_t - \hat{T}_{min}}{\hat{T}_{max} - \hat{T}_{min}}\right) \\
& \alpha_1 < \alpha_2 \\
& q_{h,1} < q_{h,2} \\
& T_t^{penalty} \geq 0 \\
& T_t^{penalty} \geq T_t - (T^{target} + T_{offset}) \\
& T_t^{penalty} \geq \left(T_t^{target} - T_{offset}\right) - T_t \\
& T_t^{min} \leq T_t \leq T_t^{max} \\
& 0.7x_t^{on,1} \leq x_t^{h,1} \leq 1.0x_t^{on,1} \\
& 0.7x_t^{on,2} \leq x_t^{h,2} \leq 1.0x_t^{on,2} \\
& T_t \geq T_t^{target} - T^{threshold} - Mx_t^{on,2} \\
& x_t^{on,2} \leq x_t^{on,1} \\
& x_t^{on,1}, x^{on,2} \in \{0, 1\}
\end{aligned}
$$

Decision Variables:

$x_t^c$- fraction of on time by AC at time t $T_t$-temperature of building at time t $c_t$-cost of operating the thermostat at time t $x_t^{on,1}$- whether the heater's first stage is turned on at time t, $x_t^{on,2}$- whether the heater's second stage is turned on at time t $x_t^{h,1}$- how long the first stage is turned on at time t $x_t^{h,2}$- how long the second stage is turned on at time t

Paramaters $\ddot{T}_1$-Initial temperature of the room $q_{h,1}$-heating rate of first stage $q_{h,2}$-heating rate of second stage $\alpha_1$-conversion factor from on time to kwh for stage 1 of heater $\alpha_2$-conversion factor from on time to kwh for stage 2 of heater $d_t$-how much the temperature naturally changes at time t β-factor for dependency of disturbance on $T_t$ $T_{target}$-target temperature $T_{offset}$-temperature offset.

$T_{threshold}$-temperature threshold below the target temperature at which the second stage heating turns on $T_{min}$-minimum allowable room temperature $T_{mas}$-maximum allowable room temperature M-large parameter (e.g., 100) to force binary variable to equal 1 under certain conditions This formulation includes two heating terms to represent two-stage heating systems in homes. There is a different cost factor for the second stage heating, and the second stage heating turns on if the temperature gets below some $T^{threshold}$ below the target temperature.

$$
\begin{aligned}
\min\ & \sum_{t \in \mathcal{T}} c_t \\
\text{s.t.}\ & T_1 = \overline{T}_1 \\
& c_t = P_t\left(x_t^{h,1}\alpha_h + x_t^c \alpha_c\right) \\
& T_{t+1} = T_t + x_t^h q_h - x_t^c q_c + d_t f(T_t; \beta, d_t) \\
& T_t^{min} \leq T_t \leq T_t^{max} \\
& 0.7x_t^{on,h} \leq x_t^h \leq 1.0x_t^{on,h} \\
& 0.7x_t^{on,c} \leq x_t^c \leq 1.0x_t^{on,c} \\
& x_t^{on,h} + x_t^{on,c} \leq 1 \\
& x_t^{on,h}, x_t^{on,c} \in \{0, 1\}
\end{aligned}
$$

This formulation includes separate terms for heating and cooling, such that one of ${x^{on,h}}_t$ or ${x^{on,c}}_t$ may be set to 1 for a time period t (but never both for the same time period). The values of $q_c$ and $q_h$ may be different, to account for different rates of heating and cooling. $d_t$ can also be positive or negative, depending on whether the home is naturally heating or naturally cooling. Further, the term multiplied by $d_t$ is now represented as f ($T_t$; β, $d_t$) because the home may now experience either positive or negative disturbances; if the disturbance is positive, then f($T_t$; β, $d_t$) will be larger when temperatures are lower; if the disturbance is negative, then f($T_t$; β, $d_t$) will be larger when temperatures are higher. This helps capture more realistic thermodynamic behavior.

Another alternative formulation is:

$$
\begin{aligned}
\min\ & \sum_{t \in \mathcal{T}} c_t \\
\text{s.t.}\ & T_1 = \overline{T}_1 \\
& c_t = P_t\left(x_t^{h,1}\alpha_1 + x_t^{h,2}\alpha_2 + x_t^c \alpha_c\right) \\
& T_{t+1} = T_t + x_t^{h,1} q_{h,1} + x^{h,2} q_{h,2} - x_t^c q_c + d_t f(T_t; \beta, d_t) \\
& \alpha_1 < \alpha_2 \\
& T_t^{penalty} \geq 0
\end{aligned}
$$

-continued $$T_t^{penalty} \geq T_t - (T^{target} + T_{offset})$$

$$T_t^{penalty} \geq \left(T_t^{target} - T_{offset}\right) - T_t$$

$$T_t^{min} \leq T_t \leq T_t^{max}$$

$$0.7x_t^{on,1} \leq x_t^{h,1} \leq 1.0x_t^{on,1}$$

$$0.7x_t^{on,2} \leq x_t^{h,2} \leq 1.0x_t^{on,2}$$

$$T_t \geq T_t^{target} - T^{threshold} - Mx_t^{on,2}$$

$$x_t^{on,2} \leq x_t^{on,1}$$

$$0.7x_t^{on,c} \leq x_t^{c} \leq 1.0x_t^{on,c}$$

$$x_t^{on,1} + x_t^{on,c} \leq 1$$

$$x_t^{on,1}, x^{on,2}, x_t^{on,c} \in \{0, 1\}$$

This formulation includes both first and second stage heating along with cooling.

The above formulations also have the option of adding constraints when the model is returned as infeasible. For instance, the initial temperature may be outside the acceptable bounds by the user. In such cases, the decision variables $x_t^{below}$ and $x_t^{above}$ are added to the model, the bounds on the temperature are removed, and the constraints below (where M is a large value such as 100) are added which indicate if the temperature is above or below the minimum and maximum temperatures.

$$x_t^{below}, x_t^{above} \in \{0, 1\}$$

$$T_t \geq T_t^{min} - Mx_t^{below}$$

$$T_t \leq T_t^{max} + Mx_t^{above}$$

If the formulation has no heating, then the following constraints are added in the infeasible case which force the cooling to be turned on completely or off if the temperature is above or below, respectively, the original temperature bounds:

$$x_t^{c} \geq x_t^{above}$$

$$x_t^{c} \leq 1 - x_t^{below}$$

If the formulation has no cooling, then the following constraints are added in the infeasible case which force the heating to be turned off or on completely if the temperature is above or below, respectively, the original temperature bounds:

$$x_t^{h} \leq 1 - x_t^{above}$$

$$x_t^{h} \geq x_t^{below}$$

If the formulation has both cooling and heating, then the following constraints are added in the infeasible case which force the cooling to be turned on completely or the heating to be turned on completely if the temperature is above or below, respectively, the original temperature bounds:

$$x_t^{c} \geq x_t^{above}$$

$$x_t^{h} \geq x_t^{below}$$

The above formulations can also be combined where applicable. For instance, the support for non-net metering can also be applied to the heating model or to the model with heating and cooling.

The importance of reducing cost relative to the importance of staying within the target temperature range is determined by the ratio between $w_1$ and $w_2$. In some example embodiments, the value of $w_2/w_1$ is in the range of 1.5 to 5, 2 to 10, 3 to 15, 4 to 20, 2 to 90, 2 to 45, 10 to 45, 45 to 90, 20 to 60, or 30 to 90. In some example embodiments, the value of $w_2/w_1$ is 2, 10, 15, 23, 40, or 90.

Furthermore, since the scheduling of the device occurs automatically once the preferences are set, one or more of the methodologies described herein may obviate a need for certain efforts or resources that otherwise would be involved in scheduling a device. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Example 1 is a system comprising: a memory that stores instructions; and one or more processors configured by the instructions to perform operations comprising: accessing preference data that identifies a target value for a condition of a device and an acceptable variation from the target value; generating a power cost signal based on power cost data and incentive data; generating, based on the preference data and the power cost signal, a schedule for power consumption by the device by minimizing a function comprising a first term representing a weighted cost and a second term representing a weighted amount of time that a value of the condition of the device differs from the target value by more than the acceptable variation; and causing the device to consume power according to the schedule.

In Example 2, the subject matter of Example 1, wherein: the device is a heating unit, an air-conditioning unit, or a hot-water heater; the condition of the device is a temperature of the device; the target value is a target temperature for heating or cooling; and the acceptable variation from the target value defines an acceptable temperature range.

In Example 3, the subject matter of Examples 1-2, wherein the generating of the power cost signal is further based on carbon production data.

In Example 4, the subject matter of Example 3, wherein the preference data further identifies a carbon cost value.

In Example 5, the subject matter of Examples 1-4, wherein the power cost signal has an hourly, quarter-hourly, or minute-level granularity.

In Example 6, the subject matter of Examples 1-5, wherein the incentive data comprises carbon credit incentive data.

In Example 7, the subject matter of Examples 1-6, wherein the incentive data comprises utility demand response incentive data.

In Example 8, the subject matter of Examples 1-7, wherein the power cost signal is further based on solar power production at a location of the device.

In Example 9, the subject matter of Examples 1-8, wherein the preference data further indicates a value for variation beyond the acceptable variation.

In Example 10, the subject matter of Examples 1-9, wherein the operations further comprise: accessing historical usage data of the device; determining an expected cost savings by implementing the schedule; and causing display of the expected cost savings in a user interface.

In Example 11, the subject matter of Examples 1-10, wherein the operations further comprise: dynamically aggregating real-time data from multiple sources including energy prices, grid demands, and environmental conditions to generate the power cost data.

In Example 12, the subject matter of Example 11, wherein the dynamically aggregating of the real-time data includes updating the real-time data at intervals determined by the volatility and temporal relevance of each of the multiple sources.

In Example 13, the subject matter of Examples 1-12 includes optimizing energy usage across a network of interconnected devices to enhance overall energy efficiency and achieve cost-effectiveness at a system-wide level.

Example 14 is a method comprising: accessing, by one or more processors, preference data that identifies a target value for a condition of a device and an acceptable variation from the target value; generating a power cost signal based on power cost data and incentive data; generating, based on the preference data and the power cost signal, a schedule for power consumption by the device by minimizing a function comprising a first term representing a weighted cost and a second term representing a weighted amount of time that a value of the condition of the device differs from the target value by more than the acceptable variation; and causing, via a network, the device to consume power according to the schedule.

In Example 15, the subject matter of Example 14, wherein: the device is a heating unit, an air-conditioning unit, or a hot-water heater; the condition of the device is a temperature of the device; the target value is a target temperature for heating or cooling; and the acceptable variation from the target value defines an acceptable temperature range.

In Example 16, the subject matter of Examples 14-15, wherein the generating of the power cost signal is further based on carbon production data.

In Example 17, the subject matter of Example 16, wherein the preference data further identifies a carbon cost value.

In Example 18, the subject matter of Examples 14-17, wherein the power cost signal has an hourly, quarter-hourly, or minute-level granularity.

In Example 19, the subject matter of Examples 14-18, wherein the incentive data comprises carbon credit incentive data.

Example 20 is a non-transitory computer-readable medium that stores instructions, which, when executed by one or more processors, cause the one or more processors to perform operations comprising: accessing preference data that identifies a target value for a condition of a device and an acceptable variation from the target value; generating a power cost signal based on power cost data and incentive data; generating, based on the preference data and the power cost signal, a schedule for power consumption by the device by minimizing a function comprising a first term representing a weighted cost and a second term representing a weighted amount of time that a value of the condition of the device differs from the target value by more than the acceptable variation; and causing the device to consume power according to the schedule. Example 21 is an apparatus comprising means to implement any of Examples 1-20.

Modules, Components, and Logic

Certain embodiments are described herein as including logic or a number of components, modules, or mechanisms. Modules may constitute either software modules (e.g., code embodied on a non-transitory machine-readable medium) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application programming interfaces (APIs)).

Electronic Apparatus and System

Example embodiments may be implemented in digital electronic circuitry, in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special-purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Software Architecture

Figure 12:
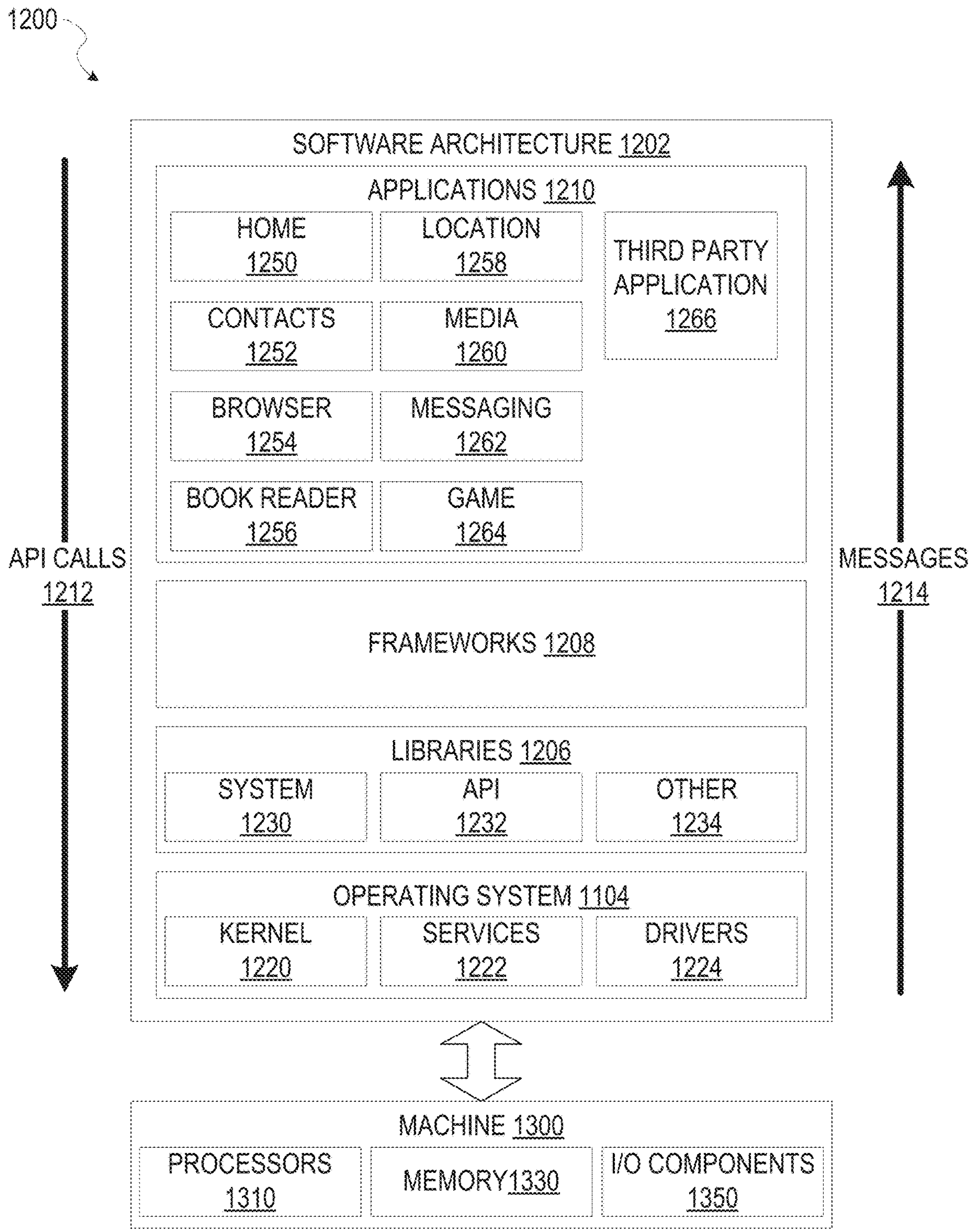
FIG. 12 is a block diagram illustrating an example of a software architecture that may be installed on a machine, according to some example embodiments.

FIG. 12 is a block diagram 1200 illustrating a software architecture 1202, which may be installed on any one or more of the devices described above. FIG. 12 is merely a non-limiting example of a software architecture, and it will be appreciated that many other architectures may be implemented to facilitate the functionality described herein. The software architecture 1202 may be implemented by hardware such as a machine 1300 of FIG. 13 that includes processors 1310, memory 1330, and I/O components 1350. In this example, the software architecture 1202 may be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, according to some implementations.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers in some implementations. For example, the kernel 1220 provides memory management, processor management (e.g., scheduling), component management, networking, and security settings, among other functionality. The services 1222 may provide other common services for the other software layers. The drivers 1224 may be responsible for controlling or interfacing with the underlying hardware. For instance, the drivers 1224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 1206 provide a low-level common infrastructure that may be utilized by the applications 1210. The libraries 1206 may include system libraries 1230 (e.g., C standard library) that may provide functions such as memory allocation functions, string manipulation functions, mathematic functions, and the like. In addition, the libraries 1206 may include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1206 may also include a wide variety of other libraries 1234 to provide many other APIs to the applications 1210.

The frameworks 1208 provide a high-level common infrastructure that may be utilized by the applications 1210, according to some implementations. For example, the frameworks 1208 provide various graphic user interface (GUI) functions, high-level resource management, high-level location services, and so forth. The frameworks 1208 may provide a broad spectrum of other APIs that may be utilized by the applications 1210, some of which may be specific to a particular operating system or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third-party application 1266. According to some embodiments, the applications 1210 are programs that execute functions defined in the programs. Various programming languages may be employed to create one or more of the applications 1210, structured in a variety of manners, such as object-orientated programming languages (e.g., Objective-C, Java, or C++) or procedural programming languages (e.g., C or assembly language). In a specific example, the third-party application 1266 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1266 may invoke the API calls 1212 provided by the mobile operating system (e.g., the operating system 1204) to facilitate functionality described herein.

Example Machine Architecture and Machine-Readable Medium

Figure 13:
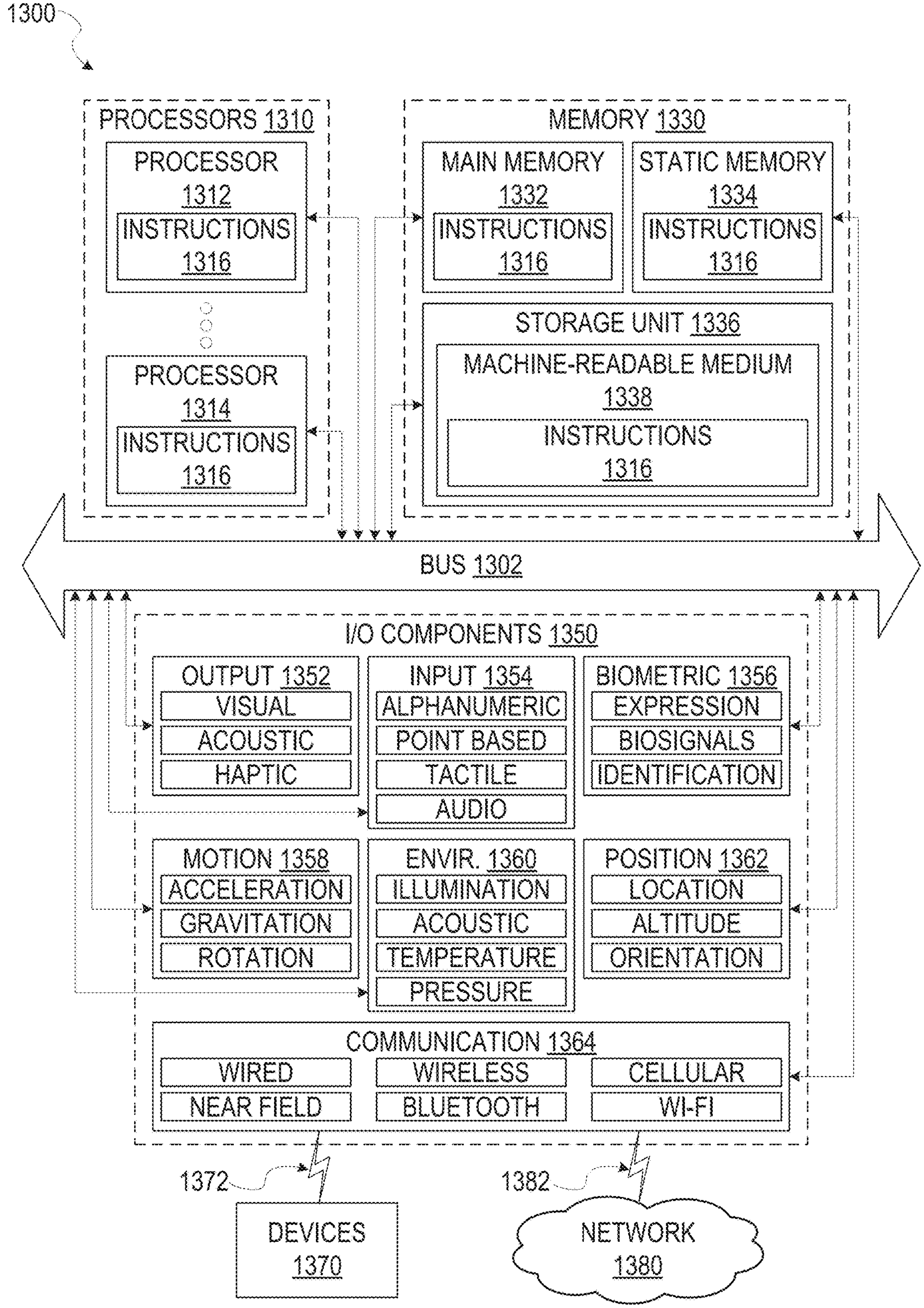
FIG. 13 is a diagrammatic representation of a machine in the form of a computer system within which a set of instructions may be executed for causing the machine to perform any one or more of the methodologies discussed herein, according to an example embodiment.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

The machine 1300 may include processors 1310, memory 1330, and I/O components 1350, which may be configured to communicate with each other via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) may include, for example, a processor 1312 and a processor 1314 that may execute the instructions 1316. The term "processor" is intended to include multi-core processors that may comprise two or more independent processors (also referred to as "cores") that may execute instructions contemporaneously. Although FIG. 13 shows multiple processors, the machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336 accessible to the processors 1310 via the bus 1302. The storage unit 1336 may include a machine-readable medium 1338 on which are stored the instructions 1316 embodying any one or more of the methodologies or functions described herein. The instructions 1316 may also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various implementations, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown in an example embodiment to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine (e.g., processors 1310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, the communication components 1364 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a USB).

Moreover, in some implementations, the communication components 1364 detect identifiers or include components operable to detect identifiers. For example, the communication components 1364 include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 1364, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1380 or a portion of the network 1380 may include a wireless or cellular network and the coupling 1382 may be a Code Division Multiple Access (CDMA) connection, a Global System for Mobile communications (GSM) connection, or another type of cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 as "non-transitory" should not be construed to mean that the medium is incapable of movement; the medium should be considered as being transportable from one physical location to another. Additionally, since the machine-readable medium 1338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A server comprising:

a memory that stores instructions; and one or more processors configured by the instructions to perform operations comprising:

accessing preference data that identifies a target value for a condition of a device and an acceptable variation from the target value, wherein the device is a heating unit, an air-conditioning unit, or a hot-water heater;

dynamically aggregating real-time data from multiple sources including energy prices from a utility, grid demands, and environmental conditions to generate power cost data;

updating the real-time data at intervals determined by volatility and temporal relevance of each of the multiple sources;

generating a power cost signal based on the power cost data and incentive data from an Independent System Operator (ISO) by adding costs and subtracting incentives;

generating, based on the preference data and the power cost signal, a schedule for power consumption by the device by minimizing a function comprising a first term representing a weighted cost and a second term representing a weighted amount of time that a value of the condition of the device differs from the target value by more than the acceptable variation; and sending commands to the device, thereby causing the device to heat or cool according to the schedule.

2. The server of claim 1, wherein:

the condition of the device is a temperature of the device;

the target value is a target temperature for heating or cooling; and the acceptable variation from the target value defines an acceptable temperature range.

3. The server of claim 1, wherein the generating of the power cost signal is further based on carbon production data.

4. The server of claim 3, wherein the preference data further identifies a carbon cost value.

5. The server of claim 1, wherein the power cost signal has an hourly, quarter-hourly, or minute-level granularity.

6. The server of claim 1, wherein the incentive data comprises carbon credit incentive data.

7. The server of claim 1, wherein the incentive data comprises utility demand response incentive data.

8. The server of claim 1, wherein the power cost signal is further based on solar power production at a location of the device.

9. The server of claim 1, wherein the preference data further indicates a maximum price for power to be paid to avoid variation beyond the acceptable variation.

10. The server of claim 1, wherein the operations further comprise:

accessing historical usage data of the device;

determining an expected cost savings by implementing the schedule; and causing display of the expected cost savings in a user interface.

11. The server of claim 1, further comprising optimizing energy usage across a network of interconnected devices to enhance overall energy efficiency and achieve cost-effectiveness at a system-wide level.

12. The server of claim 1, wherein the generating of the schedule is further based on an initial state of the device as reported by a sensor.

13. A method comprising:

accessing, by one or more processors, preference data that identifies a target value for a condition of a device and an acceptable variation from the target value, wherein the device is a heating unit, an air-conditioning unit, or a hot-water heater;

dynamically aggregating real-time data from multiple sources including energy prices, grid demands, and environmental conditions to generate power cost data;

updating the real-time data at intervals determined by volatility and temporal relevance of each of the multiple sources;

generating a power cost signal based on the power cost data and incentive data from an Independent System Operator (ISO) by adding costs and subtracting incentives;

generating, based on the preference data and the power cost signal, a schedule for power consumption by the device by minimizing a function comprising a first term representing a weighted cost and a second term representing a weighted amount of time that a value of the condition of the device differs from the target value by more than the acceptable variation; and sending commands from a server to the device via a network, thereby causing the device to heat or cool according to the schedule.

14. The method of claim 13, wherein:

the condition of the device is a temperature of the device;

the target value is a target temperature for heating or cooling; and the acceptable variation from the target value defines an acceptable temperature range.

15. The method of claim 13, wherein the generating of the power cost signal is further based on carbon production data.

16. The method of claim 15, wherein the preference data further identifies a carbon cost value.

17. The method of claim 13, wherein the power cost signal has an hourly, quarter-hourly, or minute-level granularity.

18. A non-transitory computer-readable medium that stores instructions, which, when executed by one or more processors, cause the one or more processors to perform operations comprising:

accessing preference data that identifies a target value for a condition of a device and an acceptable variation from the target value, wherein the device is a heating unit, an air-conditioning unit, or a hot-water heater;

dynamically aggregating real-time data from multiple sources including energy prices from a utility, grid demands and environmental conditions to generate power cost data;

updating the real-time data at intervals determined by volatility and temporal relevance of each of the multiple sources;

generating a power cost signal based on the power cost data and incentive data from an Independent System Operator (ISO) by adding costs and subtracting incentives;

generating, based on the preference data and the power cost signal, a schedule for power consumption by the device by minimizing a function comprising a first term representing a weighted cost and a second term representing a weighted amount of time that a value of the condition of the device differs from the target value by more than the acceptable variation; and sending commands to the device, thereby causing the device to heat or cool according to the schedule.

19. The non-transitory computer-readable medium of claim 18, wherein:

the condition of the device is a temperature of the device;

the target value is a target temperature for heating or cooling; and the acceptable variation from the target value defines an acceptable temperature range.

20. The non-transitory computer-readable medium of claim 18, wherein the generating of the power cost signal is further based on carbon production data.

* * * * *